(12) United States Patent
Chen

(10) Patent No.: US 7,818,658 B2
(45) Date of Patent: Oct. 19, 2010

(54) MULTIMEDIA PRESENTATION SYSTEM

(76) Inventor: Yi-Chih Chen, P.O. Box 893936, Temecula, CA (US) 92589

( * ) Notice: Subject to any disclaimer, the term of this patent is extended or adjusted under 35 U.S.C. 154(b) by 0 days.

(21) Appl. No.: 11/501,285

(22) Filed: Aug. 8, 2006

(65) Prior Publication Data

US 2006/0277454 A1 Dec. 7, 2006

(51) Int. Cl.
*G06F 17/00* (2006.01)
*G06F 3/00* (2006.01)
(52) U.S. Cl. .................................. 715/201; 715/730
(58) Field of Classification Search ............ 715/500.1, 715/200, 719, 720, 722, 723, 731, 732, 733, 715/739, 201, 202, 204; 352/50, 48; 463/1; 462/15; 345/473, 474, 475
See application file for complete search history.

(56) References Cited

U.S. PATENT DOCUMENTS

| | | | | |
|---|---|---|---|---|
| 4,962,463 | A * | 10/1990 | Crossno et al. ............. 715/201 |
| 5,195,092 | A * | 3/1993 | Wilson et al. ............... 725/146 |
| 5,307,456 | A * | 4/1994 | MacKay ...................... 715/782 |
| 5,388,197 | A * | 2/1995 | Rayner ........................ 715/723 |
| 5,659,793 | A * | 8/1997 | Escobar et al. ............. 715/202 |
| 5,920,700 | A | 7/1999 | Gordon et al. |
| 5,953,725 | A | 9/1999 | Ephrahim et al. |
| 6,084,581 | A | 7/2000 | Hunt |
| 6,173,328 | B1 | 1/2001 | Sato |
| 6,199,082 | B1 | 3/2001 | Ferrel et al. |
| 6,226,785 | B1 | 5/2001 | Peterson et al. |
| 6,366,914 | B1 * | 4/2002 | Stern ........................... 707/10 |
| 6,397,230 | B1 | 5/2002 | Carmel et al. |
| 6,523,046 | B2 | 2/2003 | Liu et al. |
| 6,559,845 | B1 * | 5/2003 | Harvill et al. ............... 345/473 |
| 6,661,418 | B1 * | 12/2003 | McMillan et al. .......... 345/473 |
| 6,889,374 | B1 * | 5/2005 | Wainwright ................ 717/115 |
| 2002/0019845 | A1 * | 2/2002 | Hariton ....................... 709/205 |
| 2002/0038374 | A1 | 3/2002 | Gupta et al. |
| 2002/0103920 | A1 | 8/2002 | Berkun et al. |
| 2002/0112180 | A1 | 8/2002 | Land et al. |
| 2002/0120634 | A1 | 8/2002 | Min et al. |
| 2002/0120925 | A1 | 8/2002 | Logan |
| 2002/0143972 | A1 | 10/2002 | Christopoulos et al. |
| 2002/0176636 | A1 * | 11/2002 | Shefi ........................... 382/285 |
| 2002/0194612 | A1 | 12/2002 | Lundberg et al. |

(Continued)

OTHER PUBLICATIONS

Binjia Jiao;"Multimedia Presentation Database System"; AMC MultiMedia 2000;pp. 515-516.*

(Continued)

*Primary Examiner*—Laurie Ries
(74) *Attorney, Agent, or Firm*—Christie, Parker & Hale, LLP

(57) ABSTRACT

A multimedia presentation system. The multi-presentation system is used to display a presentation using a presentation script and a plurality of presentation assets. The presentation script defines how the presentation assets are used to create a complete presentation. The presentation may be edited by editing the presentation script without editing the presentation assets. The separation of a presentation into a presentation script and presentation assets facilitates exchanges of presentations without necessarily exchanging all of the presentation. The multimedia presentation system may be used by a single user for replay of presentations. A plurality of multimedia presentation systems may also be coupled through a network to facilitate exchange of presentation scripts and presentation assets.

54 Claims, 19 Drawing Sheets

U.S. PATENT DOCUMENTS

| | | |
|---|---|---|
| 2002/0198864 A1 | 12/2002 | Ostermann et al. |
| 2002/0198944 A1 | 12/2002 | Moss |
| 2003/0001880 A1* | 1/2003 | Holtz et al. ................. 345/716 |
| 2003/0018663 A1* | 1/2003 | Cornette et al. .......... 707/500.1 |
| 2003/0056010 A1 | 3/2003 | Kaars |
| 2003/0061369 A1 | 3/2003 | Aksu et al. |
| 2003/0110176 A1 | 6/2003 | Morgan et al. |
| 2004/0001106 A1* | 1/2004 | Deutscher et al. ........... 345/838 |
| 2004/0034869 A1* | 2/2004 | Wallace et al. ................ 725/45 |
| 2004/0039934 A1* | 2/2004 | Land et al. .................. 713/200 |
| 2004/0227760 A1* | 11/2004 | Anderson et al. ........... 345/473 |
| 2004/0227761 A1* | 11/2004 | Anderson et al. ........... 345/473 |
| 2004/0227762 A1* | 11/2004 | Colby ........................ 345/473 |
| 2004/0243597 A1* | 12/2004 | Jensen et al. ................ 707/100 |
| 2007/0005795 A1* | 1/2007 | Gonzalez .................... 709/232 |

OTHER PUBLICATIONS

Thuong et al., "Multimedia Modeling Using MPEG-7 for Authoring Multimedia Integration", ACM, 2003, 171-178.*

Selcuk et al, "View Management in Multimedia Databases", 2000, The VLDB Journal, pp. 131-153.*

* cited by examiner

```
<movie 302
  music="soundtrack1" 304
  music_is_linked="0" 305
  music_base_url="" 306
  music_size="" 310
  music_c_url="" 308
  music_hbd="0" 311
  date="10.16.2003" 312
  title="Just Story" 314
  nb_frames="1" 316
  version="1.5" 318
  name="cwarexess2"> 320
  <clip id="act5clips/50341" 322
    thumb="0" 324  scale_h="161" 326
    scale_v="161" 328
    flip_h="0" 330
    flip_v="0" 332
    rot_angle="0" 334
    loc_h="0" 336
    loc_v="0" 338
    is_linked="0" 339
    base_url="" 340
    c_url="" 342
    clip_size="0" 344
    hbd="0" 345
    image_count="52" 346
    original_image_count="52" 348
    last_scene_length_change_type="none" 350
    scene_length_event_list="[1]" 352
    scene_length_list="[[1, 52]]" /> 354
</movie> 356
```

FIG. 3

```
<sfx sprite_list="[5, 5]" 401
  timeline_list="[32, 52]" 402
  alpha_list="[100, 100]" 403
  size_list="[100.0000, 100.0000]" 404
  x_list="[110.0000, 110.0000]" 406
  y_list="[-51.0000, -51.0000]" 408
  theta_list="[0.0000, 0.0000]" 409
  flip_h="0" 410
  flip_v="0" 412
  is_linked="0" 413
  c_url="" 414
  base_url="" 416
  element_size="0" 418
  color_list="[#ffff, #ffffff]" type="5" />
  420
```

```
<prop sprite_list="[6, 6]" 502
  timeline_list="[1, 52]" 504
  alpha_list="[100, 100]" 505
  size_list="[100.0000, 100.00000]" 506
  x_list="[145, 145]" 508
  y_list="[-16, -16]" 510
  theta_list="[0.0000, 0.0000]" 511
  flip_h="0" 512
  flip_v="0" 514
  is_linked="0" 515
  c_url="" 516
  base_url="" 518
  element_size="0" 520
  color_list="[#ffffff, #ffffff]" 522
  type="1" /> 524
```

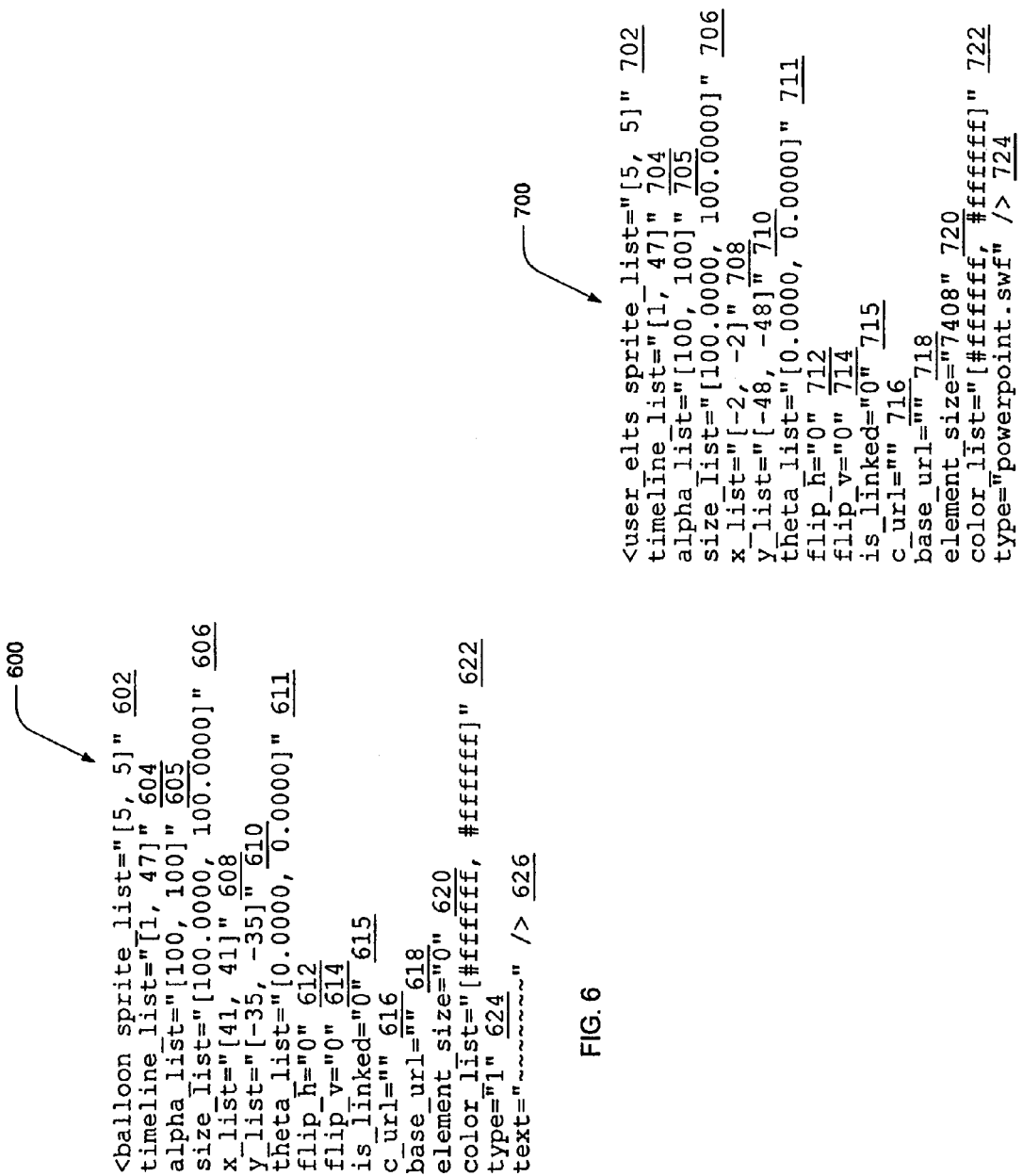

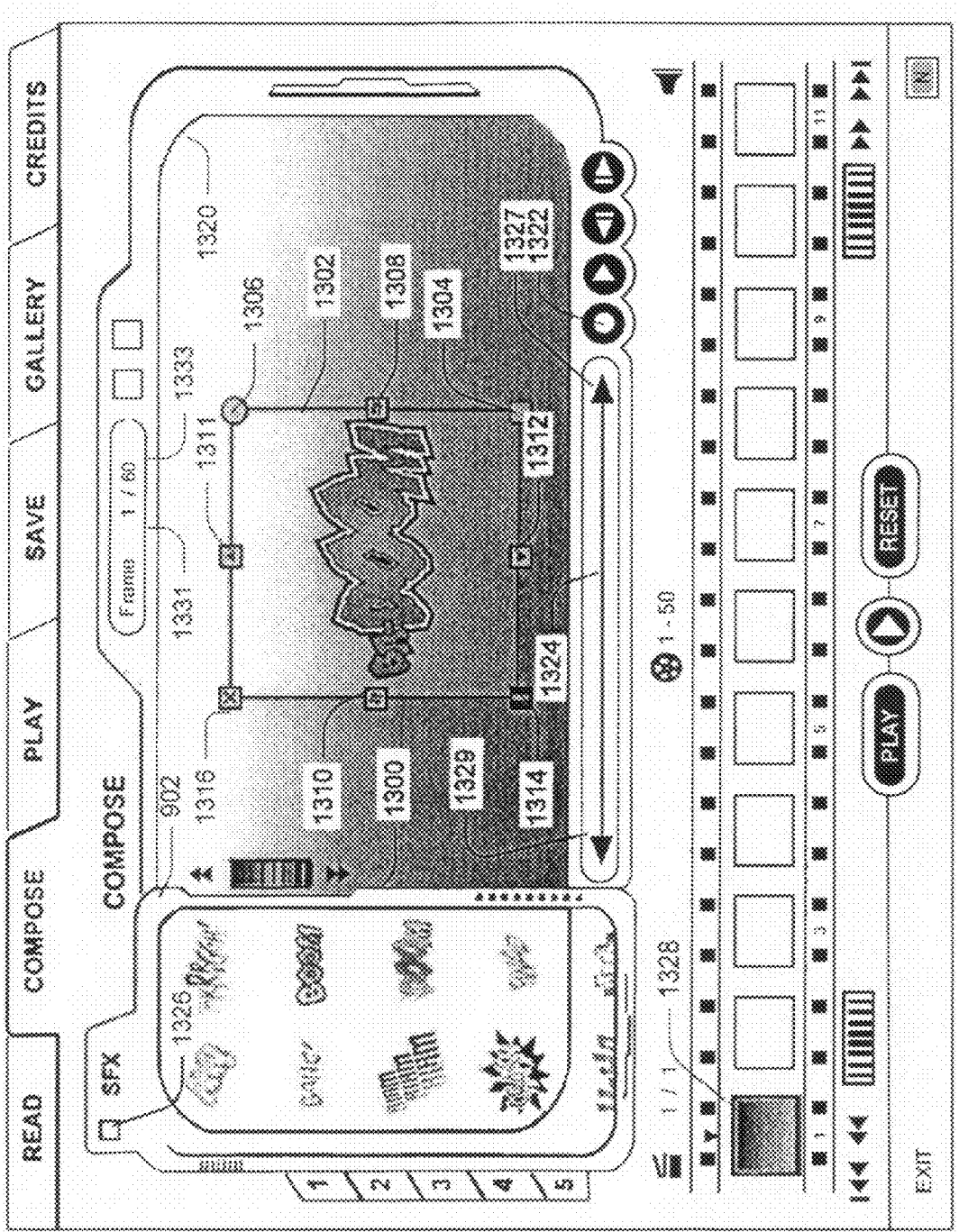

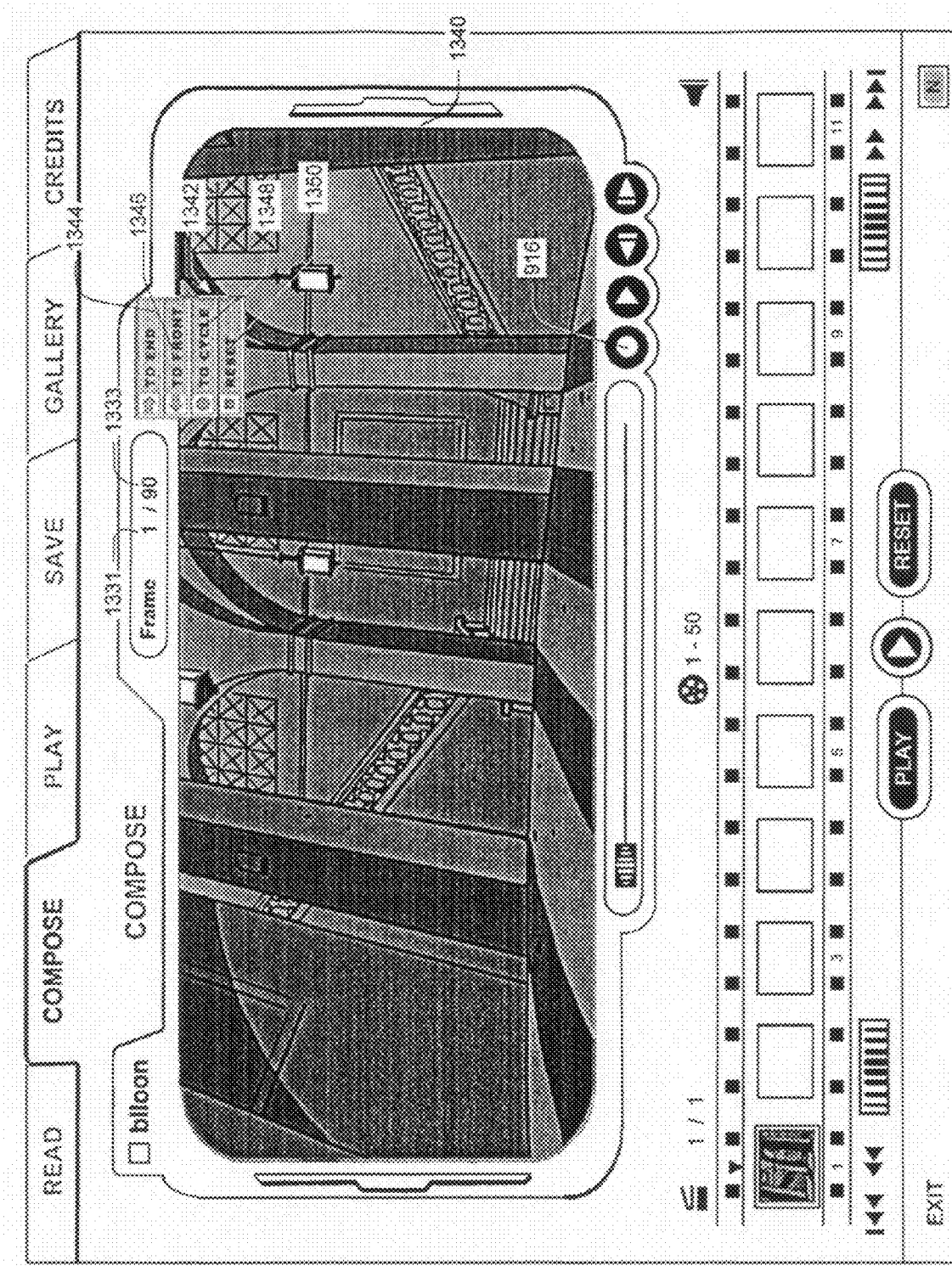

MULTIMEDIA PRESENTATION SYSTEM

CROSS REFERENCE TO RELATED APPLICATIONS

This application claims the benefit of U.S. patent application entitled "MULTIMEDIA PRESENTATION SYSTEM", application Ser. No. 10/746,130, filed Dec. 26, 2003, which claimed the benefit of Provisional Application No. 60/528, 343, filed, Dec. 9, 2003, which is hereby incorporated by reference as if fully stated herein.

BACKGROUND OF THE INVENTION

This invention pertains generally to multimedia presentation system and more specifically to systems wherein the multimedia presentation may be edited by a user.

Current storytelling media and applications are limited in that they do not embody both presentation and composition functions in one integrated system. The creative aspect and the viewing aspect of a story presentation (whether a story is included in a novel, a play, or a movie) are treated as two completely separated human activities. Despite enormous technological advances of recent years, conceptually, the storytelling remains as old as that of the first printed book: a one-way communication encased in an irreversible apparatus.

Another limitation of current storytelling media and applications is the limited life span of the traditional storytelling media. For instance, a movie despite its complexity and scale, much like a disposable camera, is a "one-use" event as far as the contents are concerned. From an economic point of view, despite enormous financial risk, it forces content of this nature to be mass produced and mass distributed. Anything less of a mass-market scale would become "uneconomical". Most of today's media are produced with this predicament. But from the creator's (or the consumer's to a larger extent) point of view, such impediment of "disposable content" per se is a total waste of talent and money. After all, "good" content creation is an arduous and expensive undertaking. Therefore, for both producers and consumers alike, a controlled means of renewable and re-editable content that could extend and regenerate life from itself is highly desirable. For example, "post-first-run" movie market and its ancillary merchandising market would be enhanced if the movie studios could re-release their titles in a format or apparatus that not only replays contents passively as "video" but also includes interactivity and functionalities for editing, recomposing, and renewing of the original content.

SUMMARY OF THE INVENTION

The present invention provides a seamless platform to bridge two previously separated experiences of human aesthetics: that of creativity and that of appreciative enactment. The platform includes a multi-presentation system used to display a presentation using a presentation script and a plurality of presentation assets. The presentation script defines how the presentation assets are used to create a complete presentation. The presentation may be modified by editing the presentation script without editing the presentation assets. The separation of a presentation into a presentation script and presentation assets facilitates exchanges of presentations without necessarily exchanging all of the presentation. The multimedia presentation system may be used by a single user for replay of presentations. A plurality of multimedia presentation systems may also be coupled through a network to facilitate exchange of presentation scripts and presentation assets between multiple users.

In one aspect of the invention, a method of generating a multimedia presentation by a multimedia presentation system is provided. A presentation system reads a presentation script including presentation instructions for displaying a presentation asset. The presentation system parses the presentation script and generates a multimedia presentation from the presentation asset using the presentation instructions.

In another aspect of the invention, the presentation system receives the presentation script by the presentation system from a multimedia presentation server via a communications network.

In another aspect of the invention, the presentation system receives the presentation assets from a multimedia presentation server via a communications network.

In another aspect of the invention, the presentation system receives the presentation script from a second multimedia presentation system via a communications network.

In another aspect of the invention, the presentation system receives the presentation assets from a second multimedia presentation system via a communications network.

In another aspect of the invention, the presentation script is modified by a user using the presentation system. During modification of the presentation script, the user may also associate a user asset with the presentation script. The user may then transmit the modified presentation script, the user assets, or both to a multimedia presentation server via a communications network using the presentation system. In addition, the user may transmit the modified presentation script and associated user assets to a second multimedia presentation system via a communications network using the presentation system.

In another aspect of the invention, the presentation system transmits a modified presentation script associated with a user asset to a multimedia presentation server or a second presentation system via a communications network. The presentation system receives a request from a second presentation system via a communications network. The request includes a request for transmission of the user asset associated with the modified presentation script. In response to the request, the presentation system transmits the requested user asset to the second presentation system via the communications network.

In another aspect of the invention, a user interface for editing a multimedia presentation includes a timeline strip for indicating a display order for individual scenes in a presentation. The user interface also includes a compose window coupled to the timeline strip for editing individual scenes in a presentation.

In another aspect of the invention, the editing user interface may further include a virtual thumbwheel for scrolling through the individual scenes. The thumbwheel is sensitive to the acceleration of a user's interaction with the thumbwheel.

In another aspect of the invention, the editing user interface's timeline strip further includes a playhead indicator.

In another aspect of the invention, the editing user interface further includes an asset bin for display of available presentation assets. The available presentation assets may include available scenes for inclusion in the timeline strip, background music, and backgrounds. The asset bin may also include a virtual thumbwheel for scrolling of the available presentation assets.

In another aspect of the invention, the compose window further includes a "frame in" slider for adjusting the frame in cue of a presentation asset and a "frame out" slider for adjusting the frame out cue of a presentation asset.

In another aspect of the invention, the compose window further includes a scene length control interface for modifying the playback length of a scene. The scene length control interface includes a total frames field for a user to enter a desired total frames number for the scene and a scene length definition menu for a user to define how the length change is to be applied to the scene.

In another aspect of the invention, a user interface for editing an asset for a multimedia presentation includes a bounding box around a display of the asset within a scene. The boundary box includes asset editing buttons on it's periphery. The editing buttons include a delete button, a rotation button, a resizing button, a flip horizontal button, a flip vertical button, a layer modification button, a color modification button, a color selection panel displayed within the bounding box, and a transparency selection slider displayed within the bounding box.

In another aspect of the invention, the bounding box further includes an add key frame button for inserting key frames to a presentation asset for further adjusting its animation, and a light box button for displaying one or more key frame images that are applied to a presentation asset.

In another aspect of the invention, a multimedia presentation system includes a first data store that stores a multimedia presentation and a first processor coupled to the first data store. The first processor is configured to allow a first user to create a multimedia presentation and store the multimedia presentation on the first data store using a user interface comprising a defined set of characteristics. A second data store that stores a multimedia presentation is coupled to a second processor. The second processor is configured to generate a displayed multimedia presentation using the stored multimedia presentation. The second processor is also configured to allow a second user to edit the stored multimedia presentation to create a second multimedia presentation using a user interface including the defined set of characteristics.

In other aspects of the invention, the first and second processor may be the same physical processor or may be separate physical processors. In addition, the first and second data stores may be the same physical data store or may be separate physical data stores as well.

In another aspect of the invention, the first and second processor are separate physical processors and the second processor is connected to the first and second data store via a communications network. The second processor stores the second multimedia presentation on the first and second data store via the communications network.

In another aspect of the invention, the first processor is coupled to the first and second data store via a communications network.

In another aspect of the invention, the multimedia presentation includes one or more presentation assets and a presentation script to generate the displayed multimedia presentation using the presentation asset.

In another aspect of the invention, the presentation script is stored in a format compatible to both the first second processors on both the first and second data stores.

In another aspect of the invention, the multimedia presentation is stored in a format compatible to both the first second processors on both the first and second data stores.

In another aspect of the invention, the second processor is further configured to allow the second user to edit the presentation script to create the second multimedia presentation.

In another aspect of the invention, the second processor is further configured to allow the second user to add one or more presentation assets used by an edited presentation script.

In another aspect of the invention, the second processor is further configured to allow the second user to retrieve the presentation script from a server via a communications network.

In another aspect of the invention, the first processor includes a first software engine that allows the first user to create the multimedia presentation and store the multimedia presentation on the storage device. The second processor includes a second software engine to generate the displayed multimedia presentation using the stored multimedia presentation. The second processor is also configured to allow the second user to edit the stored multimedia presentation to create the second multimedia presentation.

In another aspect of the invention, the first and second software engine are the same software engine.

BRIEF DESCRIPTION OF THE DRAWINGS

These and other features, aspects, and advantages of the present invention will become better understood with regard to the following description, appended claims, and accompanying drawings where:

FIG. 3 is a presentation script in accordance with an exemplary embodiment of the present invention;

FIG. 4 is a tag for a sound effect in accordance with an exemplary embodiment of the present invention;

FIG. 5 is a tag for a prop in accordance with an exemplary embodiment of the present invention;

FIG. 6 is a tag for a balloon in accordance with an exemplary embodiment of the present invention;

FIG. 7 is a tag for a user element in accordance with an exemplary embodiment of the present invention;

FIG. 13a is a scene editing user interface in accordance with an exemplary embodiment of the present invention;

FIG. 13c is a depiction of a user interface for modification of an asset's display time length in accordance with an exemplary embodiment of the present invention;

DETAILED DESCRIPTION

Figure 1:
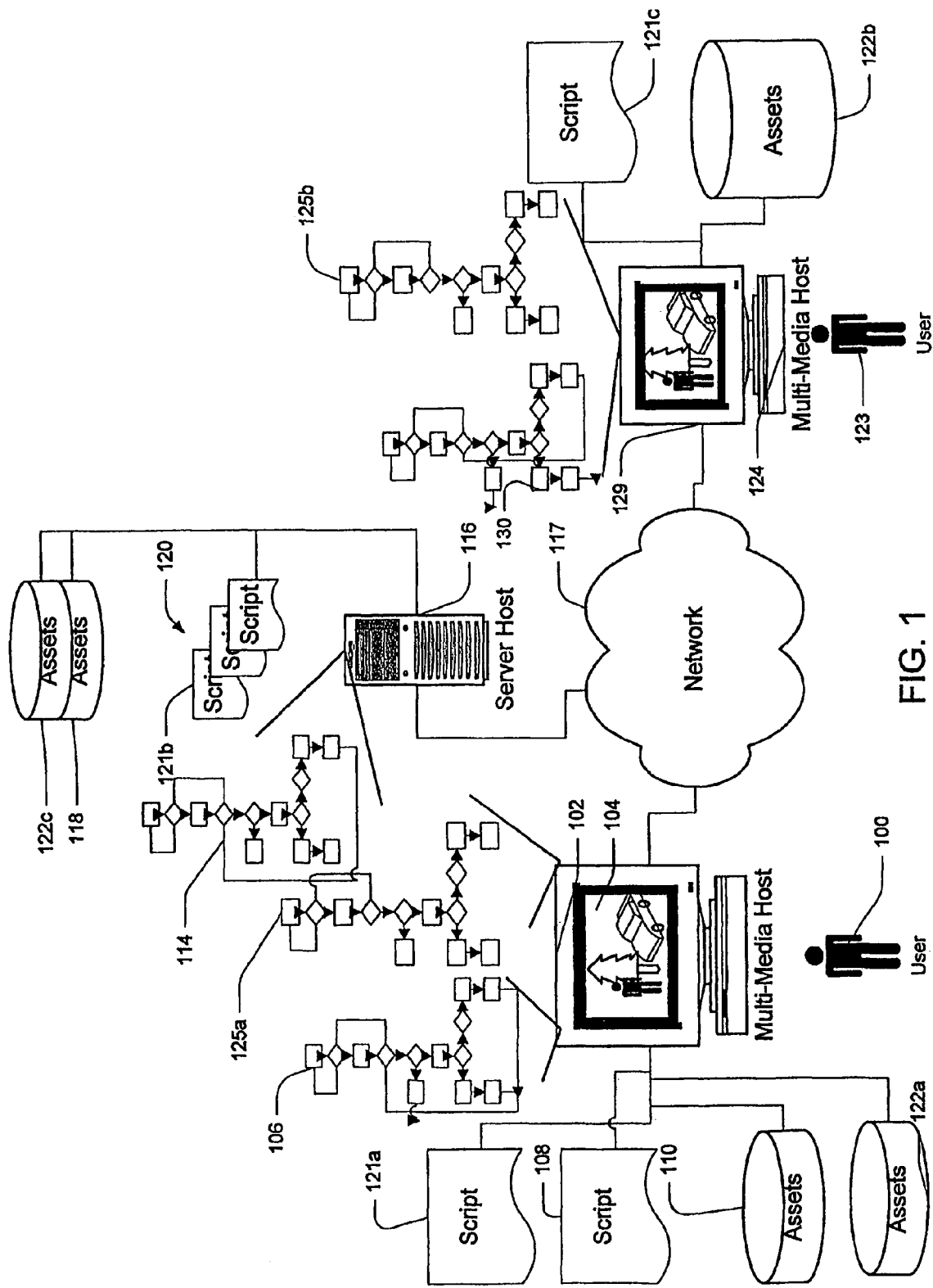
FIG. 1 is a block diagram of a networked multimedia system in accordance with an exemplary embodiment of the present invention.

FIG. 1 is a block diagram of a networked multimedia system in accordance with an exemplary embodiment of the present invention. The present invention includes a modulated asset architecture having separated presentation assets and presentation scripts used to deliver a complete multimedia presentation to a user. The separation between assets and scripts enables the user to reedit or make changes to the original multimedia presentation. Separation of the assets and the scripts also enables efficient transport of re-edited presentations via a communications network. Thus further encourages user's to re-edit and re-distribute a multimedia presentation.

A user, such as first user 100, utilizes a multimedia system host 102 to display and edit a multimedia presentation 104. The multimedia presentation is displayed by multimedia presentation software 106 utilizing a presentation script 108. The presentation script is used by a presentation engine included in the multimedia presentation software to organize and display presentation assets 110 stored in a data store such as a database or a file system. The assets may be various digital media including still pictures, background music, sound effects, dialog, animation, and digitized video content. The presentation script includes presentation instructions for use by the presentation engine in organizing, formatting, and integrating the assets into a multimedia presentation.

A user may also use the multimedia presentation system host to access a multimedia presentation server 114 hosted by a server host 116 via a computer network 117. The multimedia presentation server includes a data store of assets 118 and presentation scripts 120 that may be copied by the first user to the multimedia presentation system host for display and use. A creator of a presentation script and assets may store the presentation script and assets on the multimedia presentation server in order to distribute a multimedia presentation.

In addition, the first user may create and edit a multimedia presentation by creating and editing a user presentation script 121a using a script editor 125a having a user interface. The user may create a new presentation script entirely or may edit an existing presentation script. The user may also add user assets 122a for use by the newly created or edited presentation script. This new script may be uploaded to the multimedia presentation server and stored 121b so that a second user 123 may access and use the multimedia presentation.

To do so, the second user uses a second multimedia presentation host 124 to access the multimedia presentation server and create a copy of the new script 121c on the second user's multimedia presentation system host. The second user may then use another multimedia presentation engine 130 to generate a multimedia presentation 129 using the new script and associated assets.

In another embodiment of a multimedia presentation system in accordance with an exemplary embodiment of the present invention, assets 122a may be stored in the first user's multimedia presentation host configured as a server. The second user's multimedia presentation host, upon receiving a presentation script, may access the first user's multimedia presentation host in a peer-to-peer relationship to request, receive, and store assets referenced by or associated with the presentation script. In this way, the first user and the second user may exchange or share an asset without burdening the multimedia presentation server. In another multimedia presentation server in accordance with an exemplary embodiment of the present invention, the new assets 122a may be uploaded by the first user and stored 122c by the multimedia presentation server for access by the second user.

In addition to accessing and viewing multimedia presentations created by the first user, the second user's multimedia presentation system may further include a second script editor 125b having a user interface similar to the first user's script editor. The second user may use the second script editor to modify a multimedia presentation generated or edited by the first user. In this way, the first and second user may exchange edited multimedia presentations with each other for a variety of purposes. For example, the first and second user may collaborate on a multimedia presentation. Or the first user may create and distribute a complete multimedia presentation expressing the first user's artistic vision. The second user may then reorganize, reformat, and reintegrate the assets into a multimedia presentation in an interactive process whereby the multimedia presentation reflects the second user's own artistic vision without deviating from the first user's themes.

The separation of the multimedia presentation assets from the structure of the presentation as represented by the presentation script enhances the ability of the first and second user to collaborate on a single presentation. In a collaboration effort, the first and second user may exchange presentation scripts without exchanging presentation assets. In this way, the first and second user may collaborate on building a story using the presentation assets without having to exchange an entire multimedia presentation each time. In addition, by having separate assets and scripts, a viewer of a presentation may take a more active role in the presentation of a story. For example, a user may reorganize and edit the presentation by editing the presentation script. However, as the edited presentation script still uses the same presentation assets as the original script, the overall themes and mood of the original presentation are not lost. In some instances, the presentation assets include amounts of additional assets (e.g. pictures, music, sound effects, dialog, video, animations, etc.) that are not used by the presentation script, but which generally relates to or expands on the assets used by the presentation scripts. In this way, a user, different from the creator of the multimedia presentation, is provided with a richer palette of material from which to modify the original multimedia presentation. Finally, a user may add additional assets into the presentation and edit the presentation script to create a new presentation all together.

Another advantage of the present invention is that the multimedia presentation may be reformatted for use on different multimedia presentation system having different file format or other formatting requirements simply by reformatting the presentation script or presentation assets into a compatible format. This allows the user to develop a multimedia presentation on one computer platform and yet distribute the multimedia presentation across many different platforms.

The present invention may be used as a platform for any type of multimedia presentation as the thematic content of the presentation is irrelevant to the underlying structure of the presentation platform. For example, the presentation could be an educational presentation such as an educational video, or a dramatic presentation. Users may also use the platform for creation and editing of storyboards for more traditional entertainment such as for a movie. Throughout the remainder of this document, examples of using an embodiment of the present invention for creation of a graphic novel will be presented.

Figure 2:
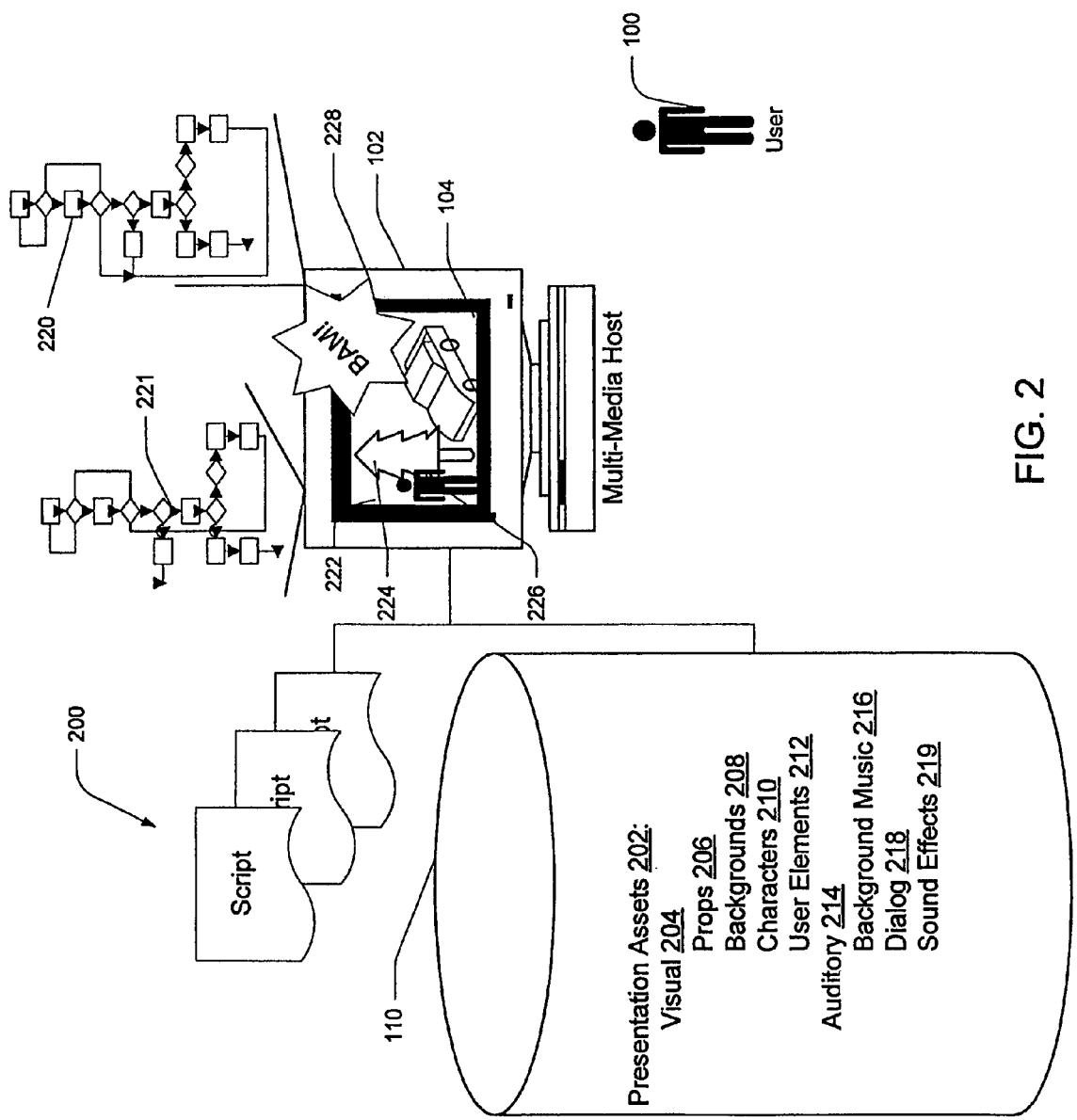
FIG. 2 is a block diagram of a multimedia system in accordance with an exemplary embodiment of the present invention.

FIG. 2 is a block diagram of a multimedia presentation system in accordance with an exemplary embodiment of the present invention. In slightly more detail, a multimedia presentation system includes a host 102 that may be a general purpose computer such as a personal computer. The host further includes a data store for storing one or more presentation scripts 200. These scripts are electronic documents written in a document markup language such as extensible Markup Language (XML) and may be easily transferred between hosts.

The host further includes a data store 110 where presentation assets 202 may be stored. The presentation assets are content objects of specified types and file formats that are referenced by the presentation scripts. The presentation assets may include visual assets 204 and auditory components 214 in various combinations. Visual assets may include static visual elements herein termed props 206. A prop is typically a static visual element that may appear with a varying duration in a presentation. A background 208 may be an animated or static visual background for a scene within a presentation. The background may also include an audio component as well. A character 210 is an animated visual or static depiction of a character that appears in a scene within a presentation. A character may have an associated audio component. A user may also add user created assets or user elements 212 to the asset data store.

Assets may further include audio components 214. The audio assets may include background music 216 that is played continuously on cue during the presentation. An audio asset may also include voiced dialog 218 and sound effects 219. The sound effects may have an associated visual component as well.

A presentation engine 221, hosted by host, uses a presentation script and the assets to generate a presentation 104. In the presentation, a background 222 is combined with cued props 224, characters 226, and sound effects 228 to create the presentation.

The user may use a script editor 220 having a graphical user interface including a defined set of characteristics and hosted by the multimedia host to edit the presentation script and presentation assets. In this way, the user may modify an existing presentation to create a variation on the themes of the existing presentation or may create a brand new presentation all together. In addition, the user interface may also be used to compose an original multimedia presentation by a user. Once a multimedia presentation is created or edited, the user uses the user interface to store the multimedia presentation in the data store.

FIG. 3 is a presentation script in accordance with an exemplary embodiment of the present invention. A presentation script 300 may be an electronic document having tags and attributes. In the exemplary script, a tag for a presentation is termed a "movie" 302. Attributes within the tag indicate where audio and visual assets may be located, when the tag was created or edited, who was responsible for creating the tag, and the size of the presentation in frames. The movie tag includes a "music" attribute 304 for identifying an audio asset used as a soundtrack. A "music_is_linked" attribute 305 indicates whether the audio asset is of external nature linking with an external location. The audio asset's location is defined by a base url attribute 306 and additional relative url attributes, such as relative music attribute 308. By using the base and additional url, a presentation engine can determine the location of an audio asset and retrieve it for the presentation. A "music size" attribute 310 is used to define the size of the audio attribute. A "date" attribute 312 identifies the date the movie tag was created. A "title" attribute 314 specifies a title for the movie tag. A "nb frames" attribute 316 specifies the number of scenes that are included in the entire presentation defined by the presentation script. A "version" attribute 318 identifies the version of presentation engine used to read and parse the presentation script. A "name" attribute 320 identifies the user name of the user that created the presentation script.

A movie tag may further include other tags identifying assets used to create a presentation. A "clip id" tag 322 identifies a visual asset used as the background for the presentation. The clip id tag may include attributes describing the location of the visual asset and the way the asset is transformed during display. A "thumb" attribute 324 indicates whether or not a thumbnail image is available for the visual asset. A "scale h" attribute 326 indicates if the amount of horizontal scaling or stretching that will be applied to the visual asset when it is displayed. A "scale v" attribute 328 indicates the amount of vertical scaling or stretching that will be applied to the visual asset when it is displayed. A "flip h" attribute 330 indicates whether or not the visual asset will be flipped horizontally when the visual asset is displayed. A "flip v" attribute 332 indicates if the visual asset will be flipped vertically when the visual asset is displayed. A "rot angle" attribute 334 defines an angle of rotation for the visual asset as it is displayed. A "loc h" attribute 336 and "loc v" attribute 338 define a horizontal and vertical offset to be applied to the visual asset when it is displayed. An "is_linked" attribute 339 indicates whether the visual asset is of external nature linking with an external location. A "base url" attribute 340 and "c url" attribute 342 define a location where the visual asset may be retrieved from. A "clip size" attribute 344 indicates the size of a visual asset. An "image count" attribute 346 indicates the number of frames or images to be displayed from the visual asset. An "original image count" attribute 348 indicates the total number of frames or images available in the visual asset. A "last scene length change type" attribute 350 indicates the type of modification last applied to the length or the display nature of the visual asset. A "scene length event list" 352 is an array indicating the change to the length or the display nature of the visual asset. A "scene length list" attribute 354 indicates the first and last frames from the visual asset that will be used for a scene. The presentation script ends with an end "movie" tag 356.

FIG. 4 is a tag for a sound effect in accordance with an exemplary embodiment of the present invention. A sound effect tag 400 includes a "sfx sprite list" 401 indicating that the tag is for a sound effect. A "timeline list" attribute 402 indicates which frames within a scene the sound effect will play during. A "size list" attribute 404 indicates the size of a visual image associated with the sound effect. An "x list" attribute 406 and a "y list" attribute 408 indicate where the graphic associated with the sound effect will be displayed. A "theta_list" attribute 409 indicates the rotation angle of the associated graphic to be displayed within a scene. A "flip h"

attribute 410 indicates if the associated graphic should be transformed by flipping it horizontally when displayed. A "flip v" attribute 412 indicates if the associated graphic should be transformed by flipping it vertically when displayed. An "is_linked" attribute 413 indicates whether the visual asset is of external nature linking with an external location. A "c url" attribute 414 and a "base url" attribute 416 indicate a location for the sound effect asset. An "element size" attribute 418 indicates the file size of the sound effect element. A "color list" attribute 420 indicates a color table to be used with the graphics associated with a sound effect.

FIG. 5 is a tag for a prop in accordance with an exemplary embodiment of the present invention. As indicated before, a prop is a static visual asset without animation. A prop tag 500 includes a "prop sprite list" attribute 502 indicating that the tag is for a prop. A "timeline list" attribute 504 indicates a starting and stopping frame for display of the prop within a scene. A "size list" attribute 506 indicates the size of the prop. An "x list" attribute 508 and a "y list" attribute 510 indicate an x,y location for display of the prop within a scene. A "theta_list" attribute 511 indicates the rotation angle of the prop to be displayed within a scene. A "flip h" attribute 512 indicates if the prop should be transformed by flipping it horizontally when displayed. A "flip v" attribute 514 indicates if the prop should be transformed by flipping it vertically when displayed. An "is_linked" attribute 515 indicates whether the prop is an external asset linked with an external location. A "c url" attribute 516 and a "base url" attribute 518 indicate a location for the prop. An "element size" attribute 520 indicates the file size of the prop element. A "color list" attribute 522 indicates a color table to be used with the graphics associated with a prop.

A "type" attribute 524 signifies the listed ID of a scene object in a particular asset group (e.g., prop, cast or etc.). A "1" means the object is the first object listed in that group. If the object is a user element then the "type" will be equal to that particular object's name (e.g., "powerpoint.swf").

FIG. 6 is a tag for a balloon in accordance with an exemplary embodiment of the present invention. A balloon is used to display textual information within a presentation. A balloon tag 600 includes a "balloon sprite list" attribute 602 indicating that the tag is for a balloon. A "timeline list" attribute 604 indicates a starting and stopping frame for display of the balloon within a scene. A "size list" attribute 606 indicates the size of the balloon. An "x list" attribute 608 and a "y list" attribute 610 indicate an x,y location for display of the balloon within a scene. A "theta_list" attribute 611 indicates the rotation angle of the balloon to be displayed within a scene. A "flip h" attribute 612 indicates if the balloon should be transformed by flipping it horizontally when displayed. A "flip v" attribute 614 indicates if the balloon should be transformed by flipping it vertically when displayed. An "is_linked" attribute 615 indicates whether the balloon is an external asset linked with an external location. A "c url" attribute 616 and a "base url" attribute 618 indicate a location for the balloon. An "element size" attribute 620 indicates the file size of the balloon object. A "color list" attribute 622 indicates a color table to be used with the graphics associated with a balloon. A "type" attribute indicates the type of the object as previously described. A "text" attribute 626 includes the text to be displayed within the balloon.

FIG. 7 is a tag for a user element in accordance with an exemplary embodiment of the present invention. A user element is a user created asset having visual and/or audio components. A user element tag 700 includes a "user elts sprite list" attribute 702 indicating that the tag is for a user element. A "timeline list" attribute 704 indicates a starting and stopping frame for display of the user element within a scene. A "size list" attribute 706 indicates the size of the user element. An "x list" attribute 708 and a "y list" attribute 710 indicate an x,y location for display of the user element within a scene. A "theta_list" attribute 711 indicates the rotation angle of the user element to be displayed within a scene. A "flip h" attribute 712 indicates if the user element should be transformed by flipping it horizontally when displayed. A "flip v" attribute 714 indicates if the user element should be transformed by flipping it vertically when displayed. An "is_linked" attribute 715 indicates whether the user element is an external asset linked with an external location. A "c url" attribute 716 and a "base url" attribute 718 indicate a location for the user element. An "element size" attribute 720 indicates the file size of the user element. A "color list" attribute 722 indicates a color table to be used with the graphics associated with a user element. A "type" attribute 724 includes the name and type of the user element as previously described.

Figure 8:
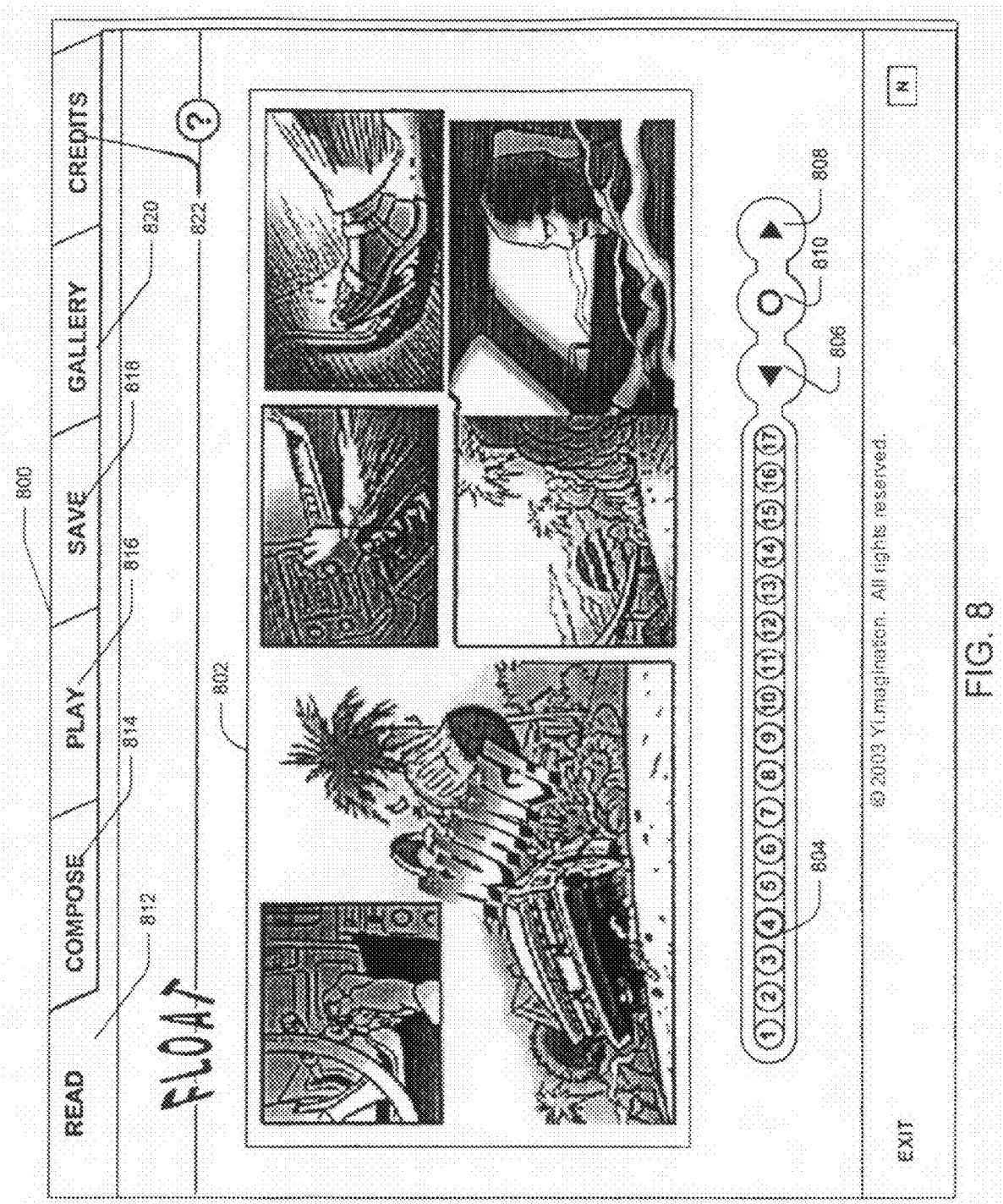
FIG. 8 is a multimedia presentation read user interface in accordance with an exemplary embodiment of the present invention.

FIG. 8 is a multimedia presentation read user interface in accordance with an exemplary embodiment of the present invention. A user uses a read user interface to display a multimedia presentation. The read user interface 800 includes a display area 802 for display of a presentation. The presentation will begin when a user enters the user interface. A presentation is organized in a plurality of sequences with narrative intervals at the end of each sequence. Typically, the presentation engine waits for the user's input before proceeding (much like book reader flipping the page at the end of each chapter). A user uses a previous button 806, a replay button 810, a next button 808, and numerical buttons 804 to control the pacing of the presentation.

Tabs, such as tab 812 are used to select the different modes available to the user. For example, the "Read" tab 812 is used to display a multimedia presentation, a "Compose" tab 814 is used to select a presentation editing mode. A "Play" tab 816 is used to play an edited presentation. A "Save" tab 818 is used to select a save mode where an edited presentation may be saved. A "Gallery" tab 820 selects a gallery mode where a user may retrieve other user's edited presentations. A "Credits" tab 822 may be used to select a credits mode where users can read the names of the creators of portions of the presentation.

With regard to the numerical buttons, each number denotes a sequence in the story. A user may select any of them to go to a desired sequence. The previous button will take the user to the previous sequence. Selecting the replay button will replay the current sequence. Unlike the replay and the numerical buttons which are active at all times, the next button comes on only at the end of each sequence, urging the user to proceed to the next sequence.

Figure 9:
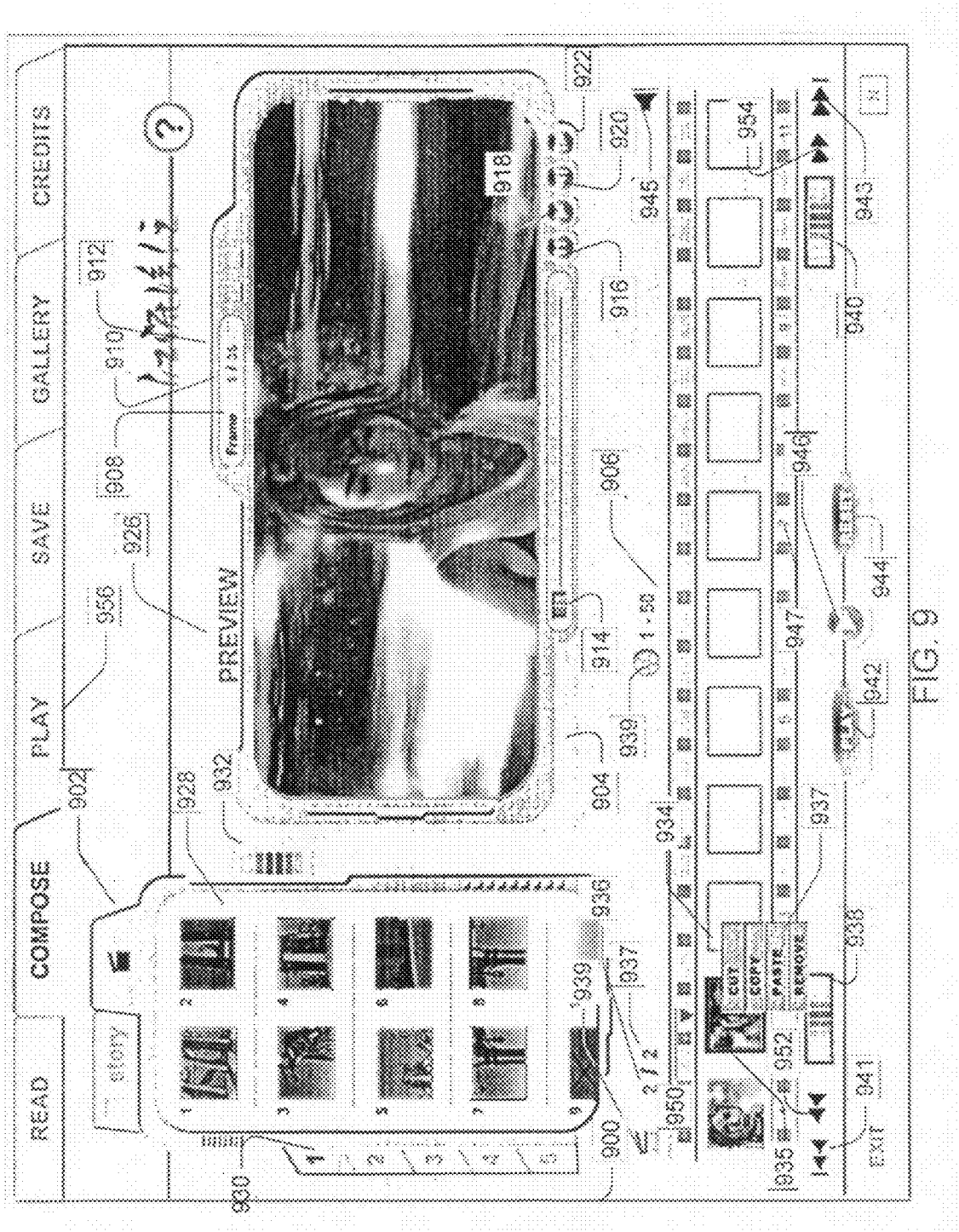
FIG. 9 is a composition user interface in accordance with an exemplary embodiment of the present invention.

FIG. 9 is a composition user interface in accordance with an exemplary embodiment of the present invention. Using composition user interface, a user edits the presentation using the same scene elements as seen in the read user interface. A user can recompose, rearrange, and recreate the original presentation using the audio and visual assets provided with the presentation. Furthermore, a user may create their own presentation assets and soundtracks to be used in conjunction with the composition of the original presentation or even build a presentation from scratch.

The composition user interface 900 includes three interface components that operate in two editing modes. The three interface components are: an asset bin 902, a preview/compose window 904, and a timeline strip 906. Two editing modes are Timeline Editing (TE) and Scene Composition (SC).

In TE, a user edits timeline assets. In SC, a user uses scene assets. Both types of assets are stored in the same asset bin but are contextually presented depending on the current editing mode. The timeline assets include digital movie clips and music of various kinds. The scene assets include compositional objects or elements with various characteristics.

In operation, a user selects thumbnails of movie clips from the asset bin and drags the selection into the timeline strip to arrange them in the order and the length the user desires. From the timeline strip, the user double clicks a scene to switch to the scene composition mode to further compose the scene with customizable scene elements such as dialog balloons, animations, props, and sound effects. The user then selects a sound track for the presentation.

In slightly more detail, the preview/compose window further includes a frame counter 908 having a current frame indicator 910 and a total frame indicator 912. The start frame counter indicates the first frame in the scene that will be displayed during the presentation. The last frame counter indicates the last frame that will be displayed from the scene during a presentation. A frame slider 914 is used by a user to selectively display frames from the scene. A pause button 916 is used by a user to pause the playback of the scene. A play button 918 is used by a user to play the scene. A user uses a frame back button 920 to step one frame back in a scene. A user uses a frame forward button 922 to step one frame forward in a scene. A mode display 926 indicates whether the scene is in the scene compose mode or timeline edit mode.

An asset bin includes a display portion 928 for display of assets that are available to a user. The asset bin is further compartmentalized and additional assets may be displayed using tab buttons 930. An individual asset display may be scrolled to display additional assets using a thumbwheel 932.

A drag-and-drop interface is prevalent to the overall look and feel of the composition user interface. Working in connection with the three main interface components, it is applied to a wide range of functions for both timeline editing and scene composition. Specifically, a user uses drag-and-drop methods to do the following:

Drag-and-drop movie clips from the asset bin to the preview window for previewing clips in timeline editing.

Drag-and-drop movie clips from the asset bin into the timeline strip for timeline editing. A user may drag-and-drop a clip to 'any' spot in the timeline strip by putting it to either end of filmstrip to cause the timeline strip to scroll to the position desired. The scroll is unrestrictive so long as the user does not release the mouse button, thus a user can search for 'any' position in the timeline strip to insert a clip. If there is a scene already in the spot the user wants to drop a clip, the drop-in clip will replace the existing scene.

Drag-and-drop scenes within the timeline strip to arrange or reshuffle scene order Drag-and-drop scenes from the timeline strip to the preview or compose window for scene previewing and/or scene composition. In scene composition mode (just as in timeline editing mode), the new dropped-in scene will replace the current scene on stage.

Drag the thumbwheel buttons left or right to scroll the timeline in either direction.

Drag-and-drop composition elements from the asset bin onto the compose stage for scene composition.

Drag an on-stage object to adjust its screen position.

Drag the frame slider along the frame track to preview a scene in real time.

The timeline strip includes a plurality of areas for display of thumbnails of the scenes 934. A current scene display 936 indicates which scene is currently selected for editing. A total scene counter 937 is used to indicate the total number of scenes in the presentation. Thumbwheels 938 and 940 are used to move the scenes back and forth within the timeline strip.

In both timeline editing and scene composition modes, a user selects the thumbnail of a scene in the timeline strip to bring up the scene editor frame 935 that is a pop-up menu appearing at the thumbnail. A selection outside of the menu will turn this menu off. In this scene editor, there are four small mouse-over buttons 937 "CUT", "COPY", "PASTE", and "REMOVE". Selecting the CUT button will copy the scene information into a temporary buffer and delete the scene from its current position in the timeline strip. Selection the COPY button will copy a scene into a temporary buffer. Selecting the PASTE button will paste a scene in the temporary buffer into a position in the timeline strip. Selection REMOVE will delete the scene from its current position in the timeline strip.

When a scene is selected in the timeline strip, the scene's scene number 936 will show up next to a clapboard icon 939. When this scene is later dragged to a different position in the timeline, the scene number indicator will reflect this new position.

The timeline strip has several data and reference icons to inform the user about the current playback and/or navigation status of a presentation.

The scene number 936 is the current scene (or selected scene) number indicator. This number progresses during presentation playback reflecting dynamically the current playhead position of the timeline. When the timeline is paused the scene number corresponds to the scene where the playhead is stopped (with white border around the scene thumbnail).

In a presentation, a "reel" includes a fixed number of scenes. For instance a first reel may include scene 1 to scene 50, a second reel may include scene 51 to scene 100, and a third reel may include 101 to 150, so on and so forth. This number is located next to a film reel icon 939. The number works in conjunction with reel jumper controls 941 and 943. Each click on a jumper button will advance or backspace the timeline by a full reel of scenes.

A sound symbol 945 represents a current selection of music for a presentation. Each time a user chooses a different track from the music panel, the selection will be reflected on this sound symbol. When a presentation is downloaded, its music track is also reflected on this symbol. A user may preview the music by selecting this sound symbol.

A scene marker 947 is located in the bottom sprocket strip of the timeline strip. Each scene marker number represents the order of that scene in relationship to the timeline.

A playhead indicator 950 is a colored triangular button located on top of each scene of the timeline strip. This button is normally dimmed. But when a user rolls a cursor over the playhead indicator, the colored triangle will light up. This playhead indicator serves both as an indicator of the current playback position of a timeline as well as a scene selecting button for a user to navigate or pause to any spot in a timeline, whether it's during playback or not.

During playback, corresponding to the scene number indicator, the playhead indicator progresses along the timeline strip indicating the current scene being played on screen. This playhead indicator progression may be out of current timeline view, but continues off stage during playback. A user may scroll to find its activity at other timeline position.

The playhead indicator also works as a 'pause' button during playback, but with much more flexibility. Instead of pausing at the current playing back scene, a user can scroll and search during playback, and use the playhead indicator to select and pause the playback 'to' any scene in the timeline. In a scene composition mode, the playhead indicator also works as a "scene switcher" for the preview/compose screen.

The playhead indicator is by default at the first scene in the timeline strip. When paused from a playback, the paused scene with the playhead indicator above it will jump to the center screen position of the timeline.

The thumbwheels, 938 and 940, are for "scrubbing" a timeline "manually" in either direction. The "scrub" is designed with a built-in motion detecting accelerator/decelerator, so that a user may adjust the user's scroll or scrub speed interactively by changing the user's cursor moving distance. This allows both fast searching of a timeline and a slow find of an individual scene.

A fast forward button 954 and fast backward button 952 allow a user to scroll a timeline at a faster and steady speed in either direction.

A "PLAY" button 942 is designated for playing back a presentation from the beginning of a given timeline (scene 1). This full playback mode includes 'title' and 'ending' screens. This playback can be paused at anytime by clicking a play/pause toggle button 946 or by selecting a new scene using the playhead indicator. A "Play" tab 956 has the same function as the PLAY button under the timeline strip. Both are to play the presentation from the first frame with a title screen. The title screen shows the name of the presentation and the name of the presentation's author.

The play/pause toggle button is a dual mode button; it's a play button when the timeline is stopped, and it's a pause button when timeline is being playback. The play mode starts a playing from the current location of the playhead indicator. A user may use this button to play from any scene in the timeline by: first selecting the playhead indicator above that scene first (a white box around the thumbnail indicates a scene is being selected), and then clicking the play/pause button to start playback from that scene. This playback mode does not include a title screen but does conclude the current session with an ending screen.

A reset button 944 will delete the presentation entirely from the timeline strip. When this button is pressed, the user is placed into a composition mode with an empty timeline strip.

Figure 10:
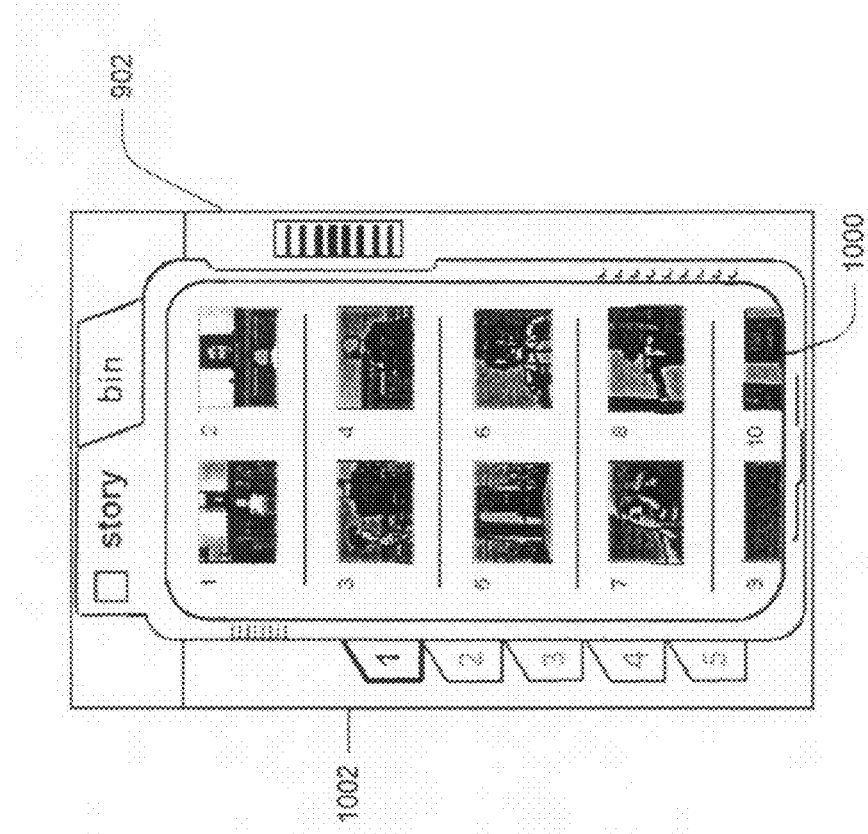
FIG. 10 is a scene selection user interface in accordance with an exemplary embodiment of the present invention.

FIG. 10 is a scene selection asset bin user interface in accordance with an exemplary embodiment of the present invention. This is the default tab space of the asset bin 902 appearing when the user first enters the composition interface. This tab includes thumbnails 1000 that represent movie clips re-purposed from the read assets. The movie-clips may be dragged to the timeline, or to the preview window for editing and preview as previously described. A plurality of tabs 1002 denote housing spaces for story clips from each act. Clicking on each tag will bring the user to the respective space for the designated act.

Figure 11:
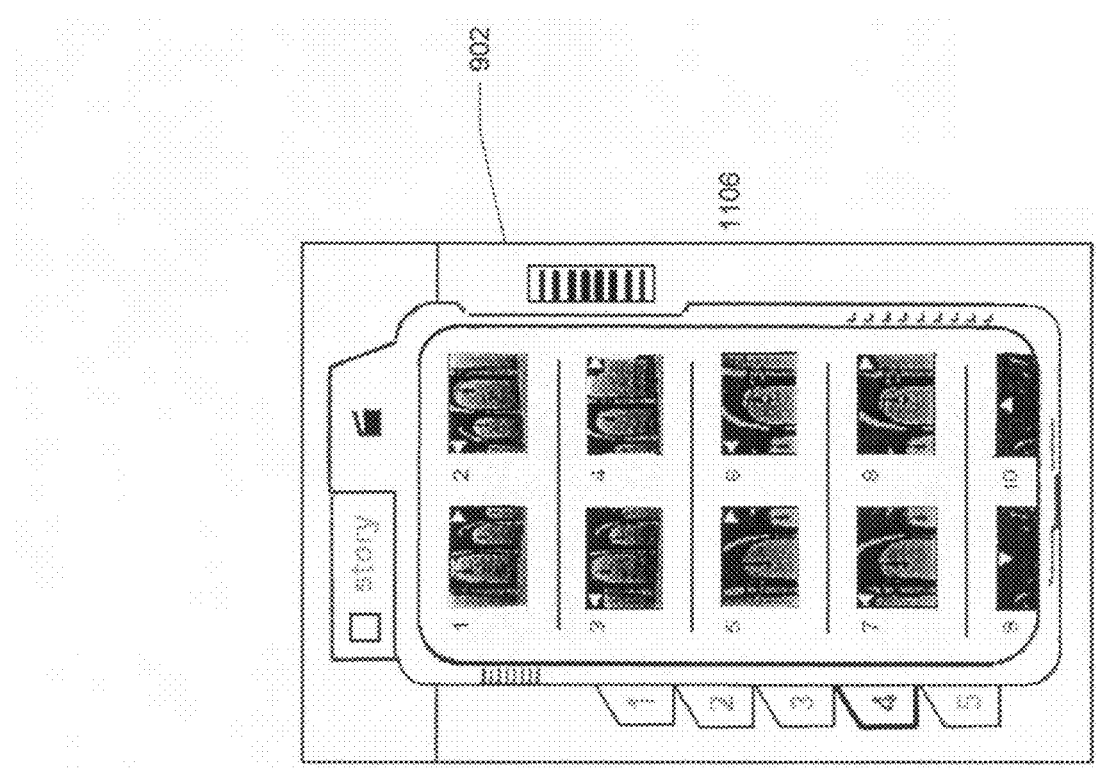
FIG. 11 is a background selection user interface in accordance with an exemplary embodiment of the present invention.

FIG. 11 is a background selection user interface in accordance with an exemplary embodiment of the present invention. The background selection user interface is an asset bin 902 that holds backgrounds for use by a user. There are two kinds of generic background clips: static and animated. Static backgrounds include static images that are repeated for a varying number of frames. Animated backgrounds include animated images. The animated backgrounds may have various running times as well. Since they are animated backgrounds, moving directions also define these clips: left, right, toward or away from camera. All these attributes are indicated on the thumbnails by a colored indicator symbol 1106 that has a white arrow in it: the arrow denotes the moving direction of the background.

Figure 12:
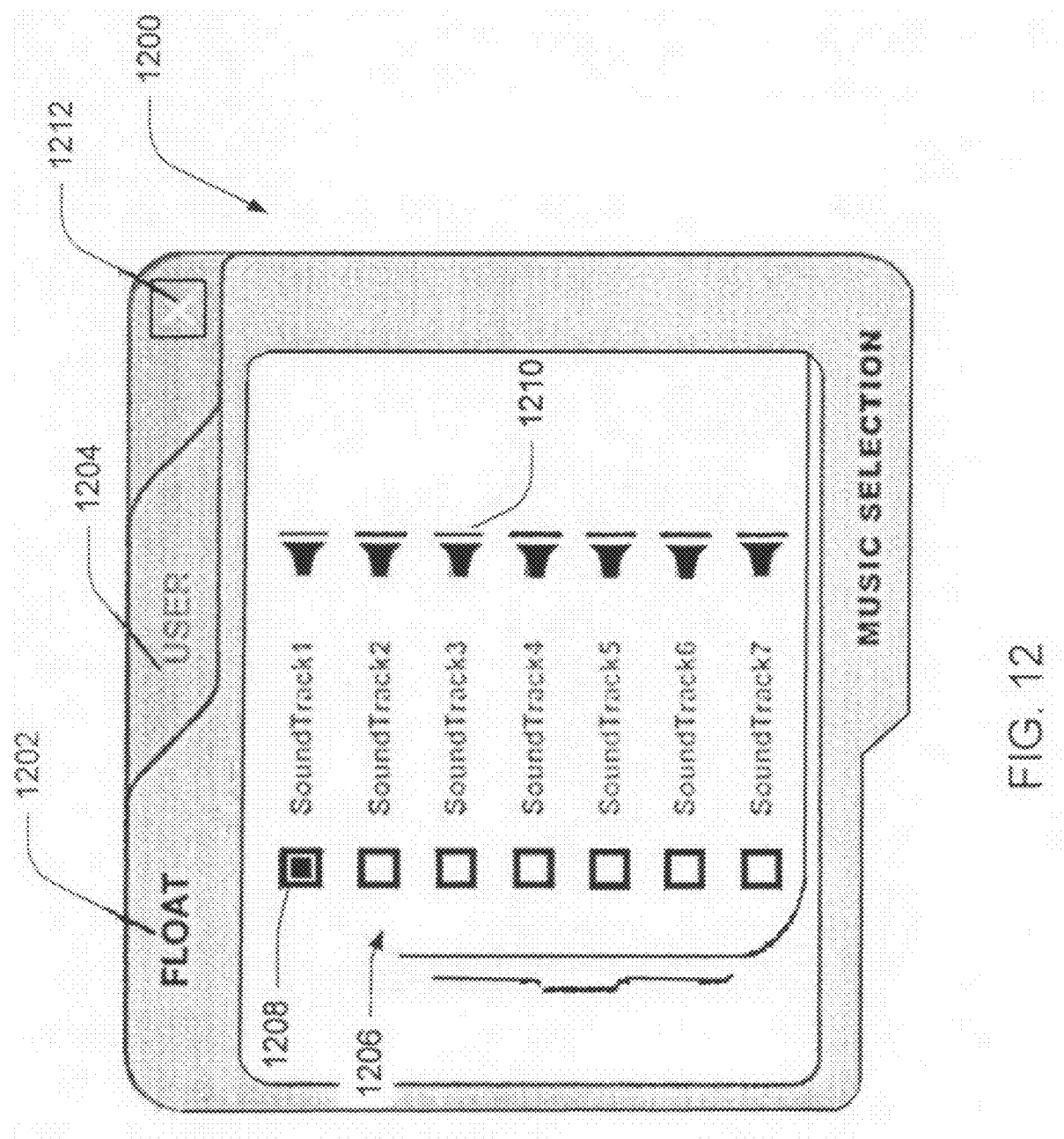
FIG. 12 is a background music selection user interface in accordance with an exemplary embodiment of the present invention.

FIG. 12 is a background music selection user interface in accordance with an exemplary embodiment of the present invention. A music selection interface 1200 is invoked by selecting the sound symbol 945 (of FIG. 9) on the timeline user interface. The music selection interface is a multi-tab that opens on top of a current interface. When the music selection panel is opened, the underneath interface is dimmed and most of its functions are temporarily inaccessible. A top tab 1202 of the music selection interface is for "THEME" music selections and another tab 1204 is for "USER" music selections. A user selects the tab name to switch between the multiple panels. In each panel there is a list 1206 of selectable soundtracks. Each list item is preceded by a check box 1208 and followed by a sound symbol 1210. The check box is for track selection and the sound symbol is for playing a track in a preview mode.

To select a soundtrack for a multimedia presentation a user selects the check box of a soundtrack. In response, the timeline's sound symbol 945 (of FIG. 9) changes its color accordingly reflecting the current selection. When the presentation is played back, the selected soundtrack will play along with the presentation. You can of course play around with different soundtracks to the same movie. Different music would create different moods for your presentation.

A user may preview any soundtrack in the music selection interface by clicking on the sound symbol at the right of that soundtrack. A user may also preview the soundtrack currently associated with a timeline by clicking the sound symbol 945 (of FIG. 9).

The music selection interface may be invoked from any section where the timeline is present (i.e., compose, play, save, and gallery). The music selection interface is opened on top of the existing interface. To return to normal operation, a user closes the music selection interface by selecting the panel's close button 1212, or selecting play 942 (of FIG. 9) on the timeline.

FIG. 13*a* is a scene composition user interface in accordance with an exemplary embodiment of the present invention. In a scene composition mode, different types of assets may be selected from the asset bin 902 and placed into a scene. In the illustrated example, the asset bin includes sound effects. These are both visual and audio assets. When a sound effect 1300 is selected from the asset bin, it is dropped into the scene. When the asset is dropped into the scene, its attributes may be edited by using a bounding box 1302 surrounding the asset. Except for minor variations in particular functions, when selected, all composition assets are presented in a bounding box with control buttons anchored symmetrically at the corners of the box and along its sides.

A user may drag an asset to any position on the compose stage by clicking within the bounding box and dragging it. The user may also use a keyboard's directional keys, with a modification key such as a "shift" key pressed, to move or fine-tune the position of the asset one pixel at a time in any direction the user wants.

When an asset is displayed in a bounding box, the frame slider track 1324 is replaced with a frame in slider 1329 and a frame out slider 1327 used to adjust cuing of the asset. The frame in slider adjusts the scene frame in which the asset will be introduced into the scene. The frame out slider adjusts the scene frame after which the asset will no longer be included in the scene. When either the frame in slider or the frame out slider is selected, the respective starting frame or ending frame of an asset will be reflected dynamically in a current frame counter 1331.

A user can drag a sizing button 1304 at a lower right corner of the bounding box inward or outward to adjust the size of the asset. If the user enlarges an object to a very large size such that part of the asset is out of the composition stage, as the user releases the selection, the bounding box will snap back to a default maximum size situated within the confines of the compose stage. This is to ensure that even when an asset is out of stage the user can still manipulate it with full controls of that asset.

A user may adjust the rotation of an asset by turning clockwise or counterclockwise a rotation button 1306 at the upper right corner of the bounding box.

A user may flip the asset horizontally using a horizontal flip button 1308. A user may flip the asset vertically using a vertical flip button 1310.

A user may bring an asset forward or backward in relation to the rest of assets currently in the scene. The two layer buttons, 1311 and 1312, lined up on the top and bottom sides of the bounding box serve this function. The top layer button (with an arrow pointing up) is for bringing the object one layer forward to the front. The bottom layer button (with an arrow pointing down) is for sending the object one layer back to the background.

A user may remove any asset from the stage by clicking a delete button 1316 at the top left corner of the bounding box. A user may also use the "Delete" key on the user's keyboard to do the same task.

Figure 13B:
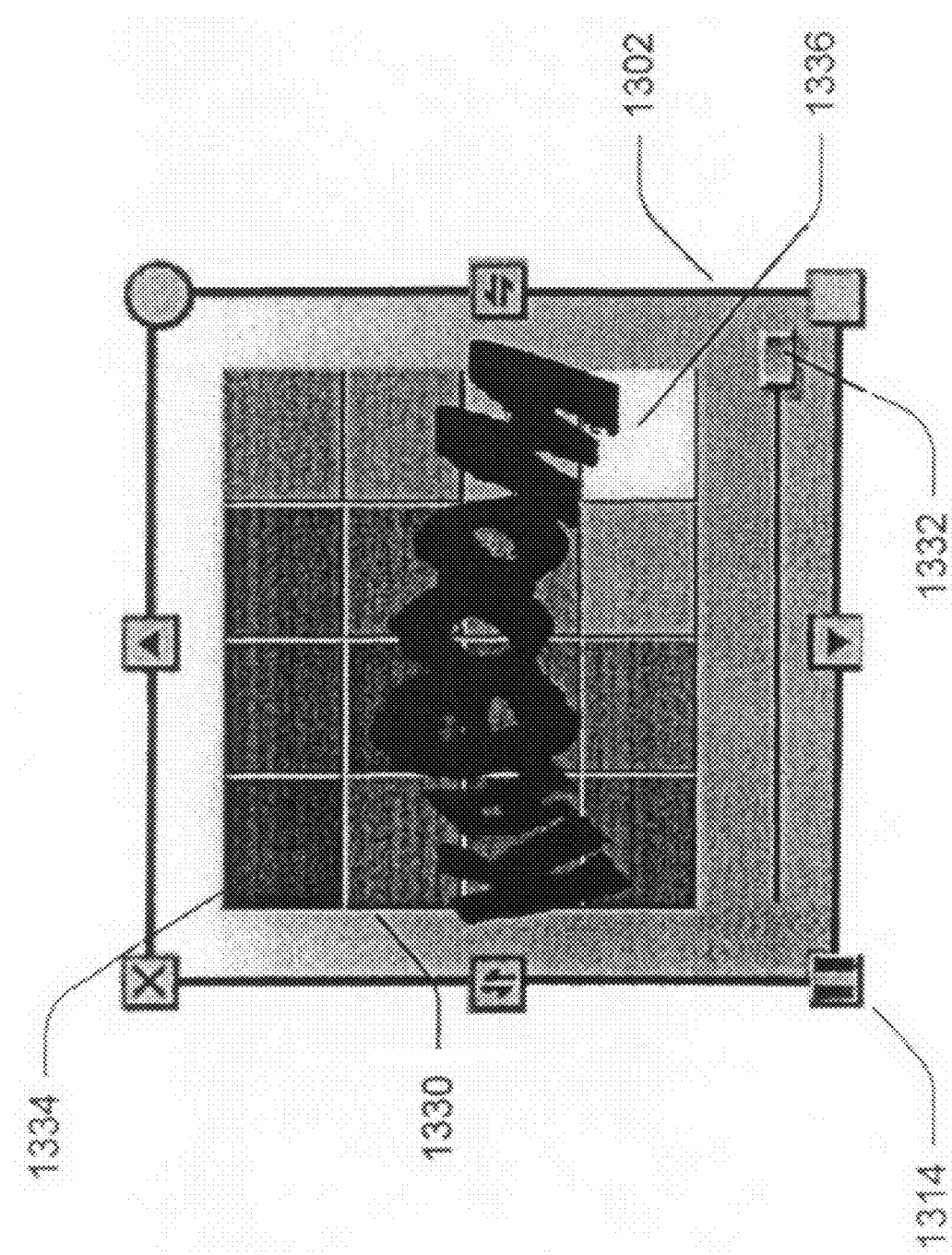
FIG. 13b is a user interface for adjusting the color and transparency of an asset in accordance with an exemplary embodiment of the present invention.

FIG. 13b is a user interface for adjusting the color and transparency of an asset in accordance with an exemplary embodiment of the present invention. A user may change the color and alpha (transparency) of an asset by clicking a color button 1314 on the bounding box 1302 to bring up a color selection panel 1330. The color selection panel contains a plurality of colors and an alpha slider 1332. Within the color selection panel, clicking on a color will change the tint of the asset to that color, except a black 1334 and a white 1336 selection. The black color selection will render the asset object totally black and the white color will return the asset to its original state. Moving the alpha slider horizontally will change the transparency of the asset. Selecting the color button again or clicking outside of bounding box will turn off the color selection panel and register the color and alpha settings.

Referring again to FIG. 13a, the bin-space for composition objects is organized by their types. The asset bins include "blloon" for balloons, cast, prop, "SFX" for sound effects, and "user" for user inserted assets respectively. Clicking a retract button 1326 on the name tab of each bin will tuck the bin away into the Compose window. This is for user to gain better composition space and maneuverability on stage. A second click of the retract button will bring the asset bin back. The types of composition asset objects are described as follows:

Blloon. This bin contains dialog balloon objects. In addition to the general attributes of composition objects (as described above), the balloon object comes with a text field where a user may type, compose or edit dialog in a similar manner as a text editor. Later, when the user records the scene, the dialog will appear in the presentation exactly as the user composed. This is the only object that includes a text variable. In addition, a bllon object may be used to hold text that is converted to speech during playback of a multimedia presentation.

Cast. This includes animated objects that can be of moving characters or objects either with or without sound effects. Their action can be of cycling nature or playing for just once. The control variables for these objects are the same as those of generic composition assets as described above.

Prop. This bin contains still pose objects that can be used as compositional elements for frame composition and/or as talking heads for a dialog sequence. The control variables for these objects are the same as those of generic composition assets as described above.

SFX. This bin contains sound effect objects that can be used to highlight the dramatic impact(s) of a scene. These objects are made of an animation that accentuates the particular aspect of these effect sound tracks. Most of them are designed to play once and its pertaining graphics will stop at the end of the sound track. But others are to be played continuously (with cycling animation and sound) until they are removed from the stage, such as a machine gun SFX. The control variables for these objects are the same as those of generic composition objects described in the section above.

User. This bin is reserved for user's own creation of scene assets.

In scene composition mode, the scene is displayed in an enlarged preview window 1320 that serves both as a scene composition canvas and as an instant edit preview screen. Other than the same set of video control buttons as seen in preview window, it has in addition an in frame slider 1329, an out frame slider 1327 and a record button 1322.

In scene composition mode, the timeline asset bin turns itself into a scene asset bin that includes sub-tags for blloon, cast, prop, SFX and user assets. The scene assets bin can be tucked away by clicking the tuck button 1326 for better screen accessibility.

In operation, the basic composition operation includes of dragging and dropping assets (blloon, cast, prop, SFX, and user) onto the compose stage, adjusting the assets variables (position, size, color etc), setting an in and an out frame for each asset, and then pressing the record button to register the edit. At this point, a letter 'E' 1328 will be flashing on above the correspondent frame in the timeline indicating that particular scene has been edited (or re-edited). This 'E' indicator is only applied to edited scene(s) in the current timeline session.

FIG. 13c is a depiction of a user interface for modification of an asset's display time length in accordance with an exemplary embodiment of the present invention. A scene length modification user interface includes one or more operational components, a frame display window 1340 and a length definition menu 1342. When a scene is in compose mode, its default length is shown in total frame field 1333 of the frame display window. If the scene is a "moving" picture clip (for example, an asset having a QuickTime, AVI, or SWF format) the total frames will default to the movie length of the scene. If the scene is a "still" picture clip (for example an asset having JPEG, GIF, or PNG format) the total frames will be default to equal one second of playing time. The current frame number 1331 and the total frame number 1333 are user selectable and definable in that a typed-in number in either field will change the frame position or the length of a scene respectively.

Using an input into the total field, a user may either shorten or prolong the scene by selecting the total number and replacing it with a new number. Upon entry, a length definition menu 1342 will pop up at the right of frame display window showing four selectable buttons: "To End" 1344, "To Front" 1346, "To Cycle" 1348 and "Reset" 1350.

By selecting the "To End" button, frames are added or subtracted to or from the end of the scene. The added frames are replications (repeats) of the last frame of the clip. The truncated frames are taken out from the last frame of the clip counting backward.

By selecting the "To Front" button, frames are added or subtracted to or from the beginning of the scene. The added frames are replications of the first frame of the clip. The truncated frames are taken out from the first frame of the clip counting forward.

By selecting the "To Cycle" button, frames are added to or subtracted from the end of the scene in a cycling manner. For example, if the original clip has 24 frames in a cycle animation and the new total is 36 frames, the new scene will contain 1.5 cycles of the original animation. Vice versa if the new total is 18 frames the new scene will be 0.75 time of the original length (meaning: 0.25 is missing from completing the original cycle). When the "To Cycle" command is applied to prolong a normal "one way" scene, the new scene will simply repeat itself at the end of the original clip.

Selecting the "Reset" button will reset the total frame to the scene's original length. Selecting a record button 916 will register the changes to the scene length. The frame display also doubles as an informatics device denoting the current slider and/or in-and-out mark position of an asset in relationship to a scene's frame space as depicting in FIG. 13*a*.

Figure 13D:
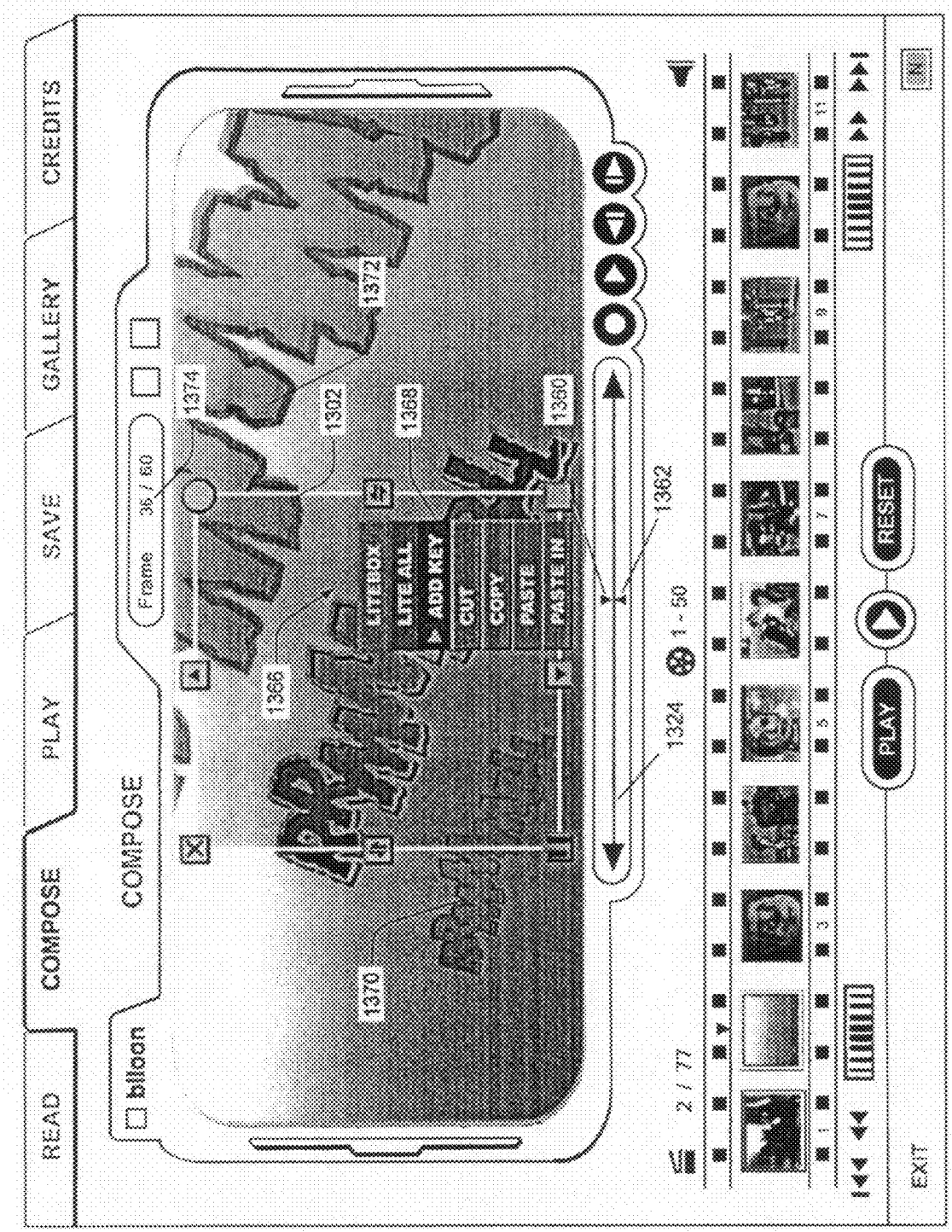
FIG. 13d is a depiction of a user interface used edit an asset's dynamic display characteristics in accordance with an exemplary embodiment of the present invention.

FIG. 13*d* is a depiction of a user interface used edit an asset's dynamic display characteristics in accordance with an exemplary embodiment of the present invention. An asset may displayed within a scene wherein the asset's display characteristics may be dynamically modified, herein termed "tweening", by the presentation engine. For example, an asset may be displayed in a first frame of a scene with a first specified sizing, position, rotation, color, transparency, etc. The same asset may be displayed in a second frame of the scene using a second specified sizing, position, rotation, color, transparency, etc. In such a dynamic asset presentation, the presentation engine interpolates sizing, position, rotation, color, and transparency parameters for the asset for any scene frames intervening between the first and second scene frames.

To add tweening to an asset, a user selects an in frame of an asset and adjusts the assets attributes using bounding box controls as depicted in FIG. 13*a* and FIG. 13*b*. The user then selects the out frame of the same object and adjust its attributes using bounding box controls. Now when playing back the scene, the object will "morph" (or tween) all of its attributes (size, position, angle, color and alpha etc.) from "in" frame to "out" frame.

Returning now to FIG. 13*d*, between the in and the out frames, a user can also insert key frames to further fine-tune the animation and timing of an object. The tween happens between any two key frames and between a key frame and the in or out frame.

To add a key frame, the users uses a frame slider 1360 to find a desired position between the in and out frames of an asset. The user then selects the asset and right-mouse-clicks within the object's bounding box 1302 to bring up the object menu 1366. If the user selects an "ADD KEY" 1368 from the menu, a key frame is added to the current object. At this point, by default a "light box" is turned on and a key frame mark 1362 is added to a corresponding spot in the object's in-n-out track 1324.

A light box effect is a display technique for a user to see through several animation drawings at the same time by as if the drawings were stacked on a light table. The light box effect is used to display key frames of an asset. There are several types of light box effects as the key frames of a selected asset may be displayed or key frames of all on stage assets may be displayed.

When either of the light boxes is on, a selected asset's bounding box changes color and other key frames, such as key frame 1370 and 1372, at other frame positions of a scene's timeline will show up in semi-transparency. The user may use these light box references to adjust the current selected object.

In the illustrated example, a key frame of an asset is being added at frame 36 as indicted by current frame field 1374. The in frame is at frame 1, as illustrated by the semi-transparent key frame 1370, and the out frame is at frame 60, as illustrated by the semi-transparent key frame 1372.

The "ADD KEY" button is dimmed and unselectable if the current frame is already a key frame. Also a key frame may only be inserted between and within an asset's "in"and "out" frames. However, a user may add as many key frames as "in" and "out" space allows.

Once a key frame is added, a user may make adjustments to its attributes (size, position, angle, color, transparency, etc.) for tweening with other key frames or in-n-out frames as depicted in FIG. 13*a* and FIG. 13*b*. A user can also readjust a key frame's scene position by dragging the key frame's mark 1362 left or right along the asset's in-and-out track. The changing frame number will reflect in the current frame display 1374. When a key frame is selected, the key frame's mark is highlighted by a color change. When the key frame is deselected, the key frame's mark returns to the mark's original color.

When the light box is on, a user may select any other on stage key frame image to go to that particular frame and asset directly. A user may also select any key frame mark in the in-and-out track to go to and select another key frame of the current asset. To remove a key frame, a user drags the key frame's mark out of the in-and-out track.

Referring again to FIG. 4, tweening is indicated for an asset using lists of values stored for each display variable that may be modified. For example, an objects position attribute 404 may include a plurality of values with each value corresponding to a specific in frame, out frame, or key frame for the asset.

Figure 14A:
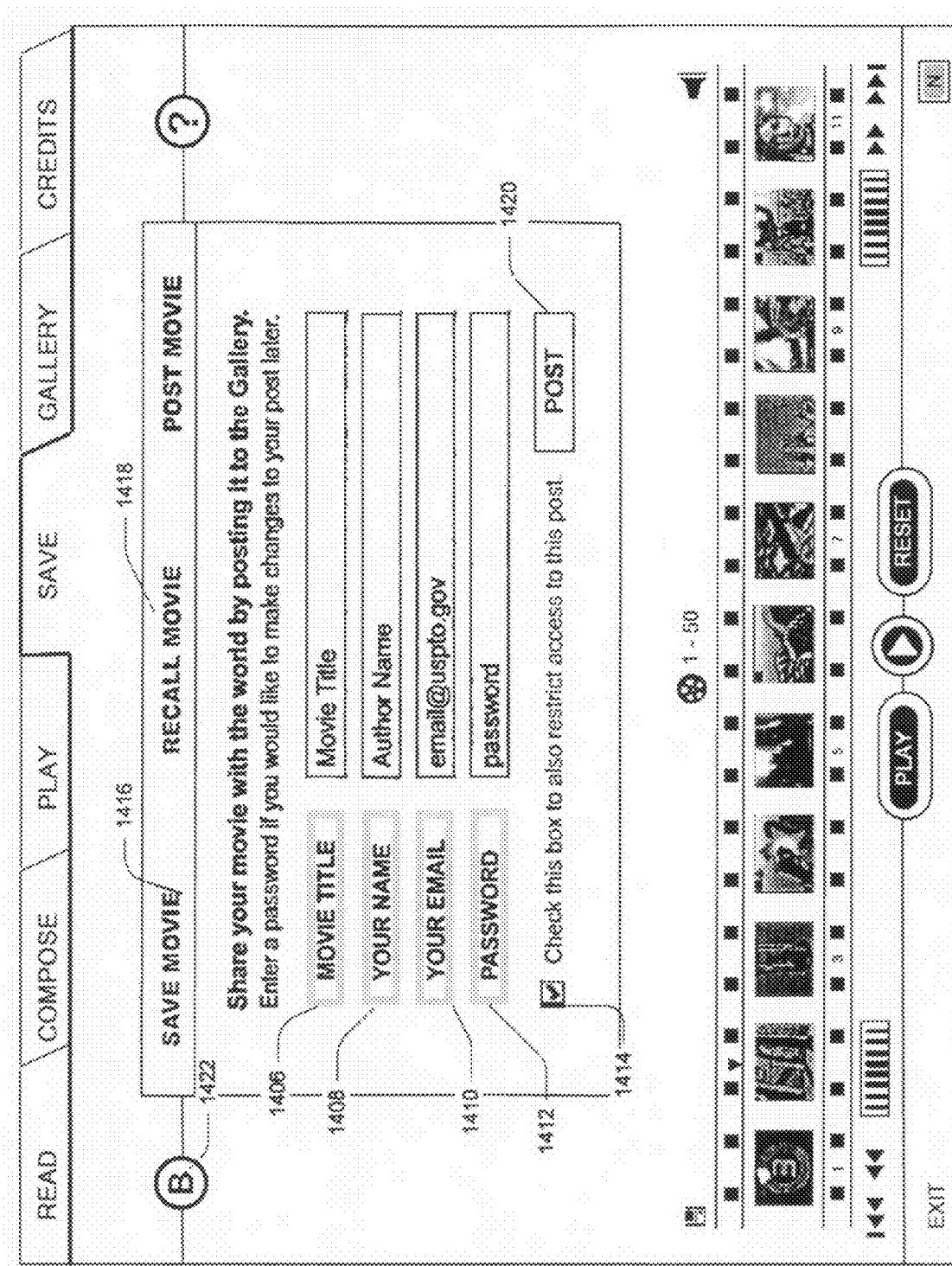
FIG. 14a is a script posting user interface in accordance with an exemplary embodiment of the present invention.

FIG. 14*a* is a script posting user interface in accordance with an exemplary embodiment of the present invention. The script posting user interface is used by a user to post presentation scripts to a common repository, such as a previously described multimedia presentation server, so that the scripts may be obtained by other users. Within the user interface, access to the repository is likened to accessing works of art in a gallery and the presentation scripts are likened to movies posted within a gallery. To post a presentation script, a user enters a title into a title field 1406, enters a user name into a name field 1408, enters an email address into an email address 1410, and enters a password into a password field 1412. If the user selects a access restriction box 1414, access is restricted to the posted presentation script to other users that have the password.

Once the user has entered all of the data into the data entry fields, the user selects a post button 1420. The user may also simply save the presentation script to local data storage by selecting a save button 1416. In addition, the user may recall the presentation script from the local data storage by selecting a recall button 1418. From the script posting interface, a user may also access a bulletin board for users by selecting a bulletin board button 1422.

Figure 14B:
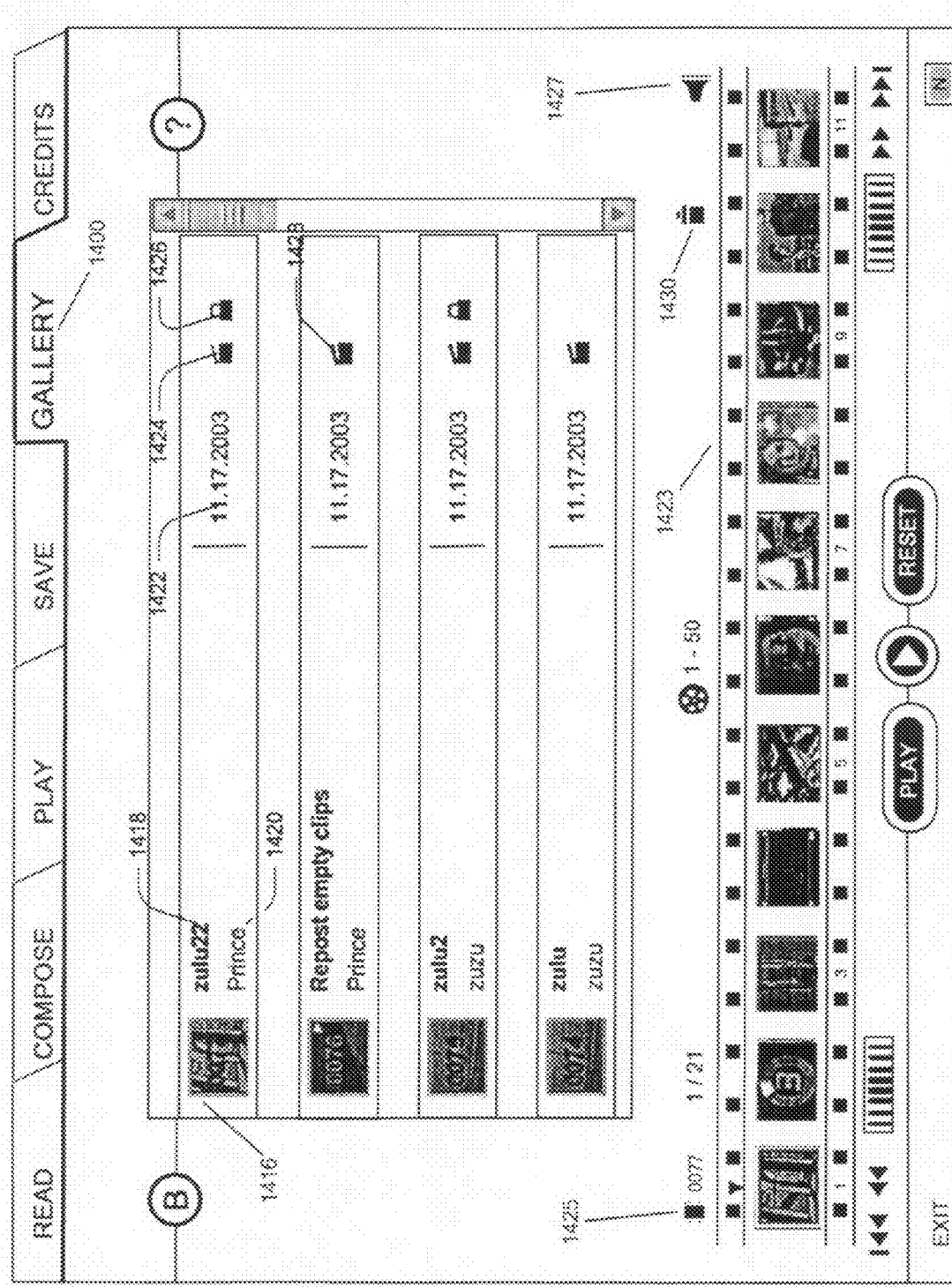
FIG. 14b is a script selection user interface in accordance with an exemplary embodiment of the present invention.

FIG. 14*b* is a script selection user interface in accordance with an exemplary embodiment of the present invention. A user uses the script selection user interface 1400 to access and view a gallery of showcased works posted by other users to the previously described presentation server. The gallery pieces are listed chronologically with the latest posting at the top. Each listing includes: a thumbnail of the presentation 1416, a title for the work 1418, an author's name 1420, and the posting date 1422 of the work. Selecting the thumbnail of a listing will have the piece 'selected' in the list and start downloading the presentation to a local timeline 1423. Once selected, a selected presentation's ID number will appear next to a 'film' icon 1425 on the timeline. In addition, the presentation's music track will be reflected in the color of the sound symbol 1427 on the right side of the timeline.

Icons are used to convey the status of each presentation. A colored clapboard 1424 means a presentation script accesses user assets. A white clapboard 1428 means the presentation script does not access user assets. A lock 1426 means a presentation is password protected. A user may delete a presentation selected from the gallery using a trash can button 1430.

The filmstrip like timeline strip that appears in each user interface is a central metaphor of the multimedia presentation system. The controls of the timeline strip link the functions (compose, play, save, and gallery) of the multimedia presentation system in one unified visual representation. The timeline is both a containing medium and a delivery vehicle for all of the assets and editorial creations.

Except for a few minor variations, the general control and navigation of the timeline work identically for all user interfaces, so that a user may move between and interact with different functions seamlessly and effortlessly. For instance, during playback the user may see something in a scene that needs adjustment; the user selects the scene to invoke the composition interface. When the user arrives in the composition interface, the user will be presented with the same timeline strip paused at the problem scene position, and the preview window shows the scene the user was viewing.

Figure 15:
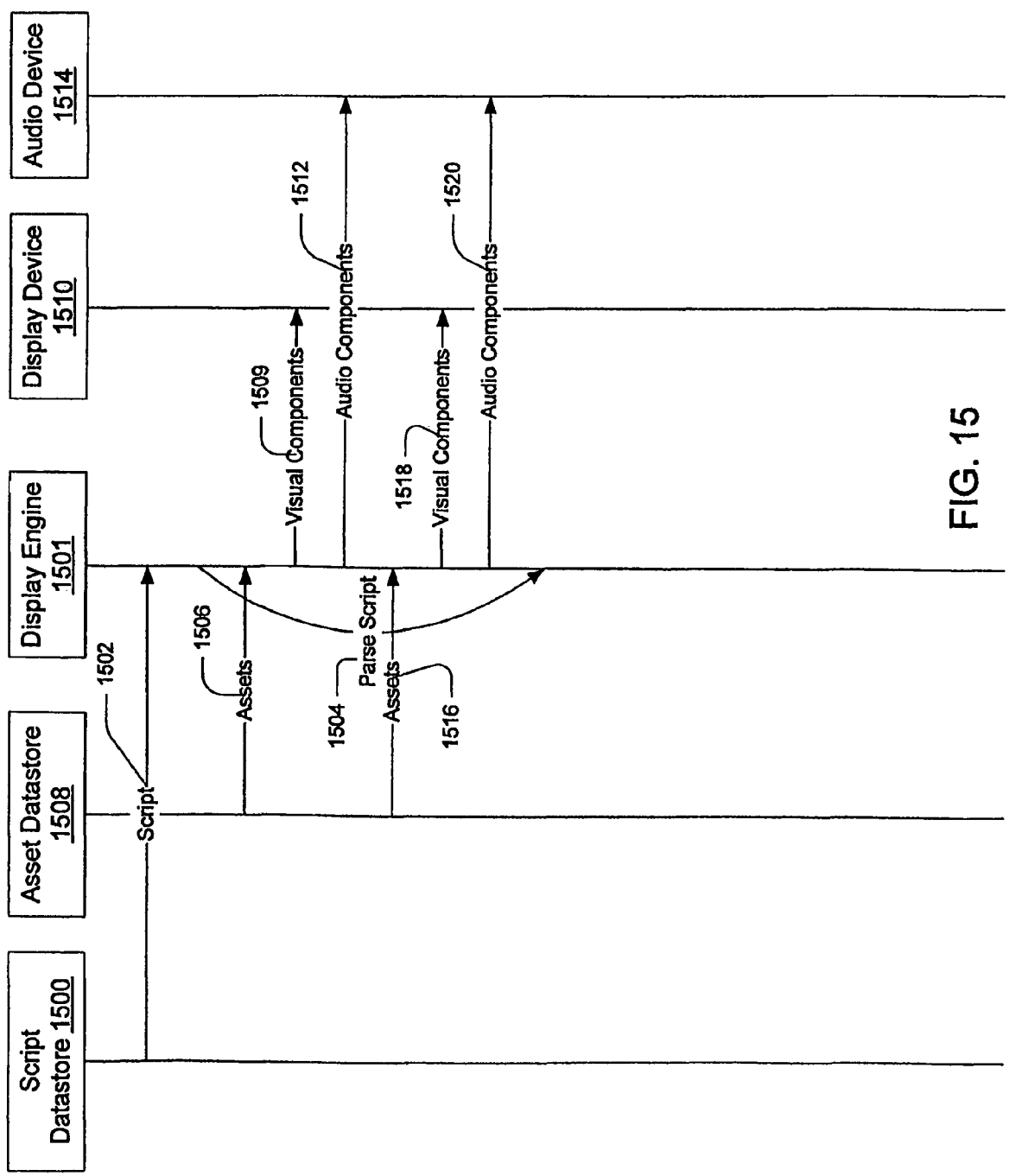
FIG. 15 is a sequence diagram of a display process in accordance with an exemplary embodiment of the present invention.

FIG. 15 is a sequence diagram of a display process in accordance with an exemplary embodiment of the present invention. In a presentation display process, a display engine 1501 reads a presentation script 1502 from a script data store 1500. The presentation engine parses 1504 the presentation script to interpret the presentation tags and attributes in the presentation script. Based on the information included in the tags and attributes, the display engine reads assets 1506 from the asset data store 1508. The display engine then transmits visual components 1509 of the assets to a visual display device 1510 for display to a user. The display engine also transmits audio components 1512 of the assets to an audio playback device 1514 for playback of the audio components to the user. To create a continuous presentation, the display engine continues parsing the script document and reading new assets 1516 from the asset data store and displaying new visual components 1518 and audio components 1520 continuously.

Figure 16A:
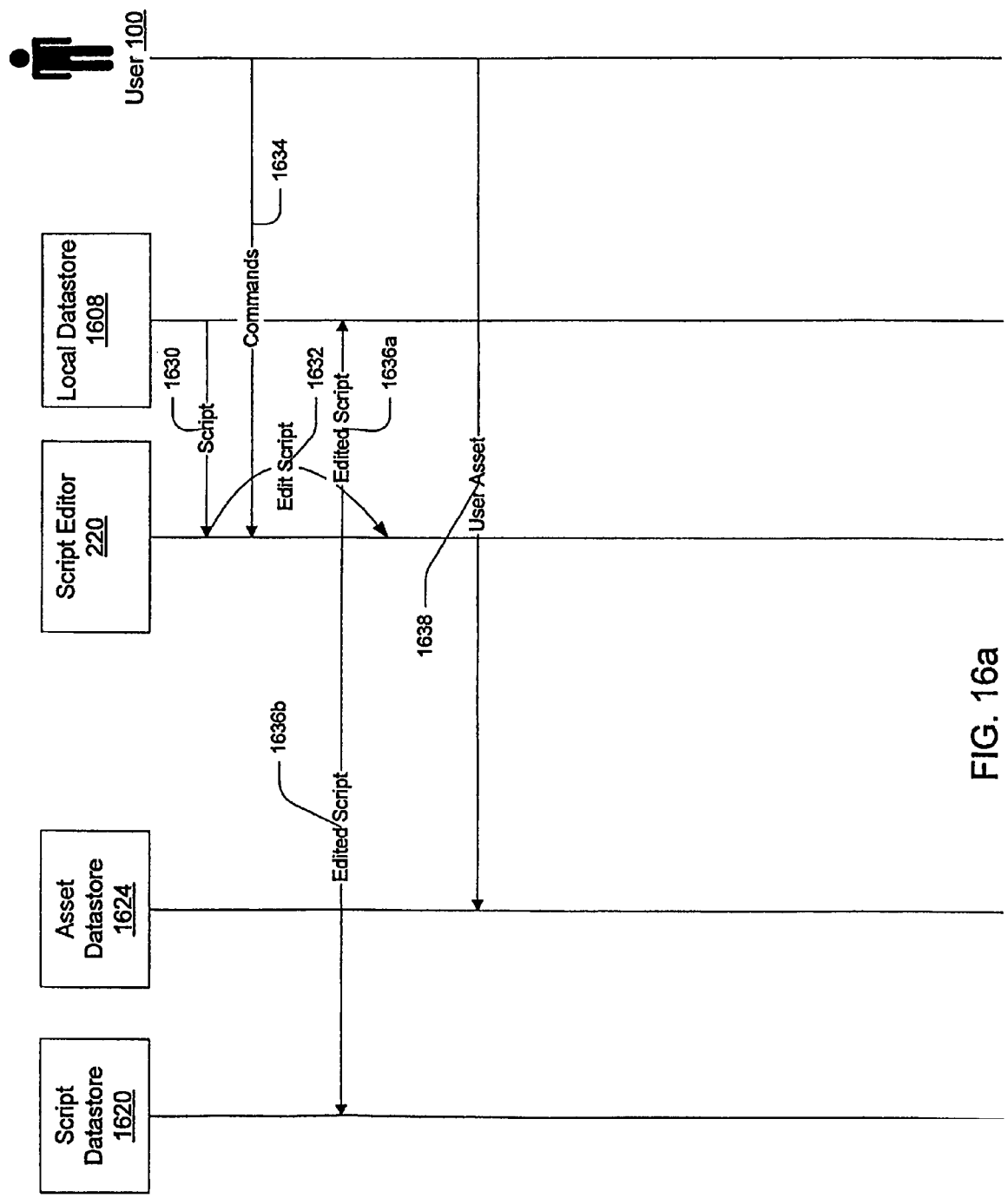
FIG. 16a is a sequence diagram for a script editing process in accordance with an exemplary embodiment of the present invention.

FIG. 16*a* is a sequence diagram for a script editing process in accordance with an exemplary embodiment of the present invention. A user 100 may use a script editor 220 to recall a script 1630 from a local data store 1608. The user may then edit (1632) the script by issuing commands 1634 to the script editor using the previously described script editing user interfaces. Once edited the edited script 1636*a* maybe restored in the local database store. The user may also transmit a version of edited presentation script 1636*b* to an external script data store 1620 such as the previously described multimedia presentation server.

In addition to editing a presentation script, a user may add additional assets for use in creating a multimedia presentation using the edited presentation scripts. To do so, the user adds the assets to an asset data store 1624. The location of this asset data store may vary depending on the user's intent. If the user is not sharing the edited presentation with others, the user asset may be stored in the user's own local data store. If the user does want to share the edited presentation with others, the user makes the asset data store available to other users such as via a server coupled to a communications network.

Figure 16B:
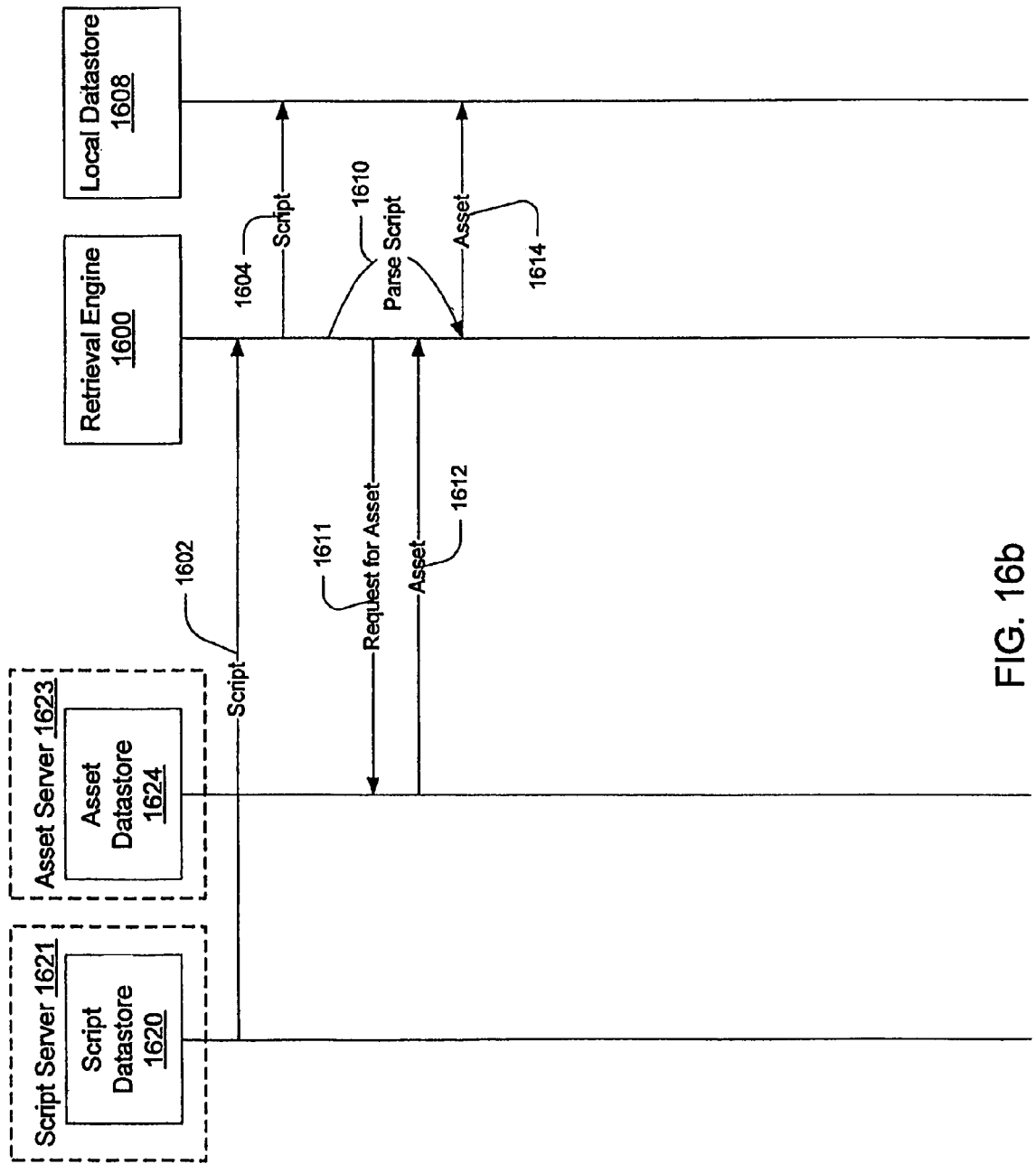
FIG. 16b is a sequence diagram for a script retrieval process in accordance with an exemplary embodiment of the present invention.

FIG. 16*b* is a sequence diagram for a script retrieval process in accordance with an exemplary embodiment of the present invention. A multimedia presentation system uses a retrieval process to access presentations stored on a server via a communications network. A script retrieval engine 1600 hosted by a multimedia system host receives a script 1602 from a script data store 1620. The script data store may be coupled to the communications network by a script server 1621 such as the previously described multimedia presentation server or another server maintained by a another user. Once the script is received, the retrieval engine stores the script 1604 in a local data store for later retrieval and use.

The retrieval engine also parses (1610) the script to determine what user assets, if any, need to be retrieved for use with the presentation script. Using asset location information in the script, the retrieval engine generates a request 1611 for an asset and transmits the request to an asset server 1623 coupling an asset data store 1624 to the communications network. In response, the asset server retrieves the requested asset 1612 from the asset data store and transmits the asset to the retrieval engine. The retrieval engine receives the asset and stores the asset 1614 in the local data store for later retrieval.

As discussed previously, the script data store and the asset data store may be resident on the same host or server or may be resident on differently addressable hosts or servers. In this way, assets, which are generally of larger size than the presentation scripts, may stored on a user's multimedia host for accessing by other users. This greatly reduces the load placed on a multimedia presentation server used to distribute presentation scripts.

Figure 17:
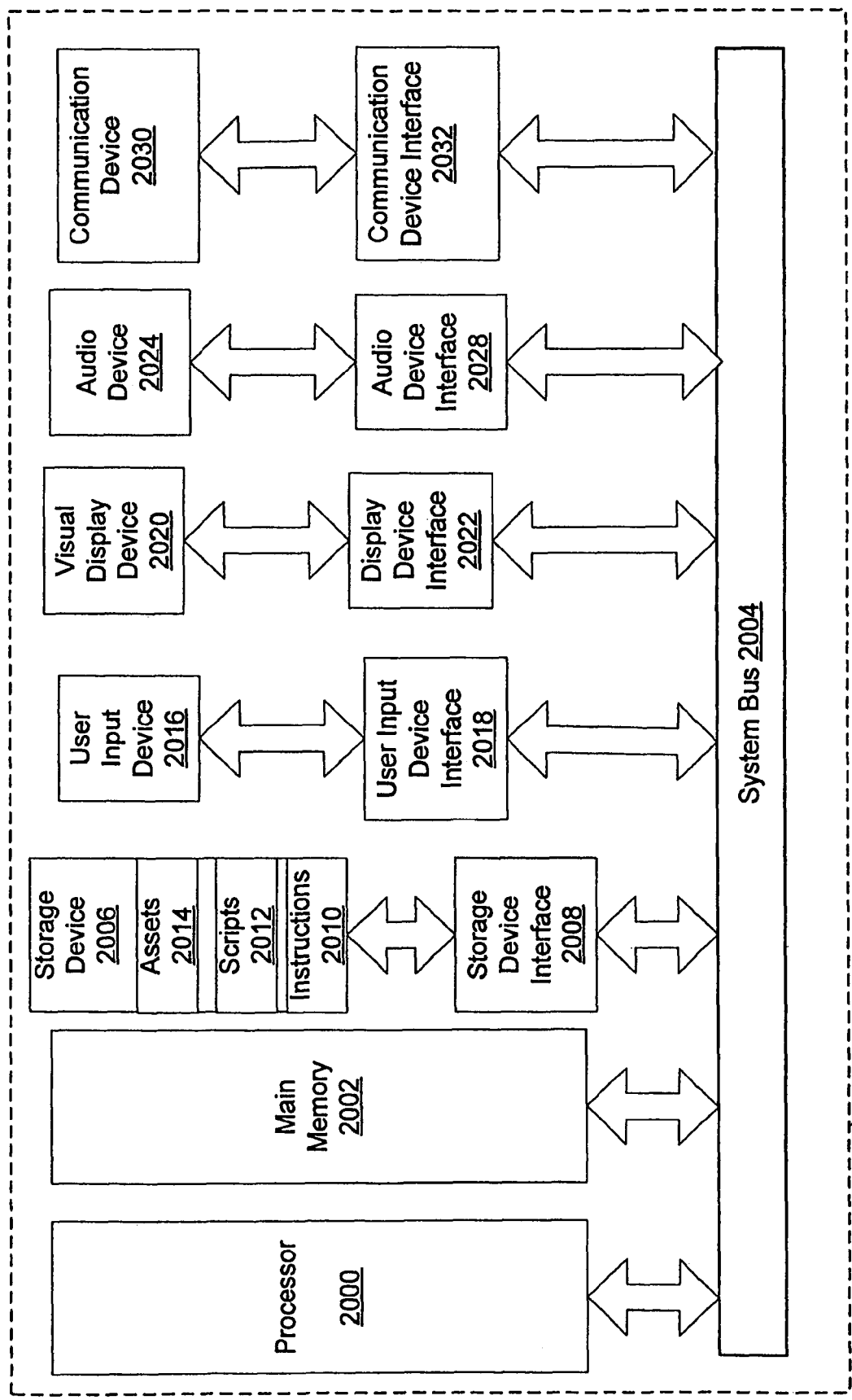
FIG. 17 is an architecture diagram for a multimedia presentation system host in accordance with an exemplary embodiment of the present invention.

FIG. 17 is an architecture diagram for a multimedia presentation system host in accordance with an exemplary embodiment of the present invention. A multimedia presentation system host 102 includes a processor 2000 coupled to a main memory 2002 via a system bus 2004. The processor is further coupled to a storage device interface 2008 via the system bus. The storage device interface is used by the processor to retrieve programming instructions 2010 stored in a storage device 2006. The processor retrieves the programming instructions and stores them in memory for execution in order to configure the processor to implement the features of a multimedia presentation system as described above.

The storage device may further include a data store for storage of a multimedia presentation stored as one or more presentation scripts 2012 and one or more presentation assets 2014. The presentation scripts include executable or interpretable instructions used by the processor to generate and display the audio and visual components of a multimedia presentation using the presentation assets.

The processor may be further coupled to a display device interface 2022 via the system bus. The processor uses the display device interface to transmit the visual components of a presentation to a display device 2020 for display to a user.

The processor may be further coupled to an audio device interface 2028 via the system bus. The processor uses the audio device interface to transmit the audio components of a presentation to an audio device 2024 for display to a user.

The processor may be further coupled to a user input device interface 2018 via the system bus. The processor uses the user input device interface to receive user inputs from a user input device 2016 during the display or editing of a presentation.

The processor may be further coupled to a communication device interface 2032 via the system bus. The processor uses the communication device interface to control a communication device 2030 coupled to a communications network (not shown). The processor may then transmit and receive communications, such as presentation scripts and presentation assets, to and from a multimedia presentation server via the communications network.

In addition to communicating with a multimedia presentation server, the processor may use the communications device to access a second multimedia presentation system via a communications network. In this way, the processor may access the second multimedia presentation system's data store to retrieve presentation scripts and presentation assets for use in generating multimedia presentations created or edited on other multimedia presentation systems.

Figure 18:
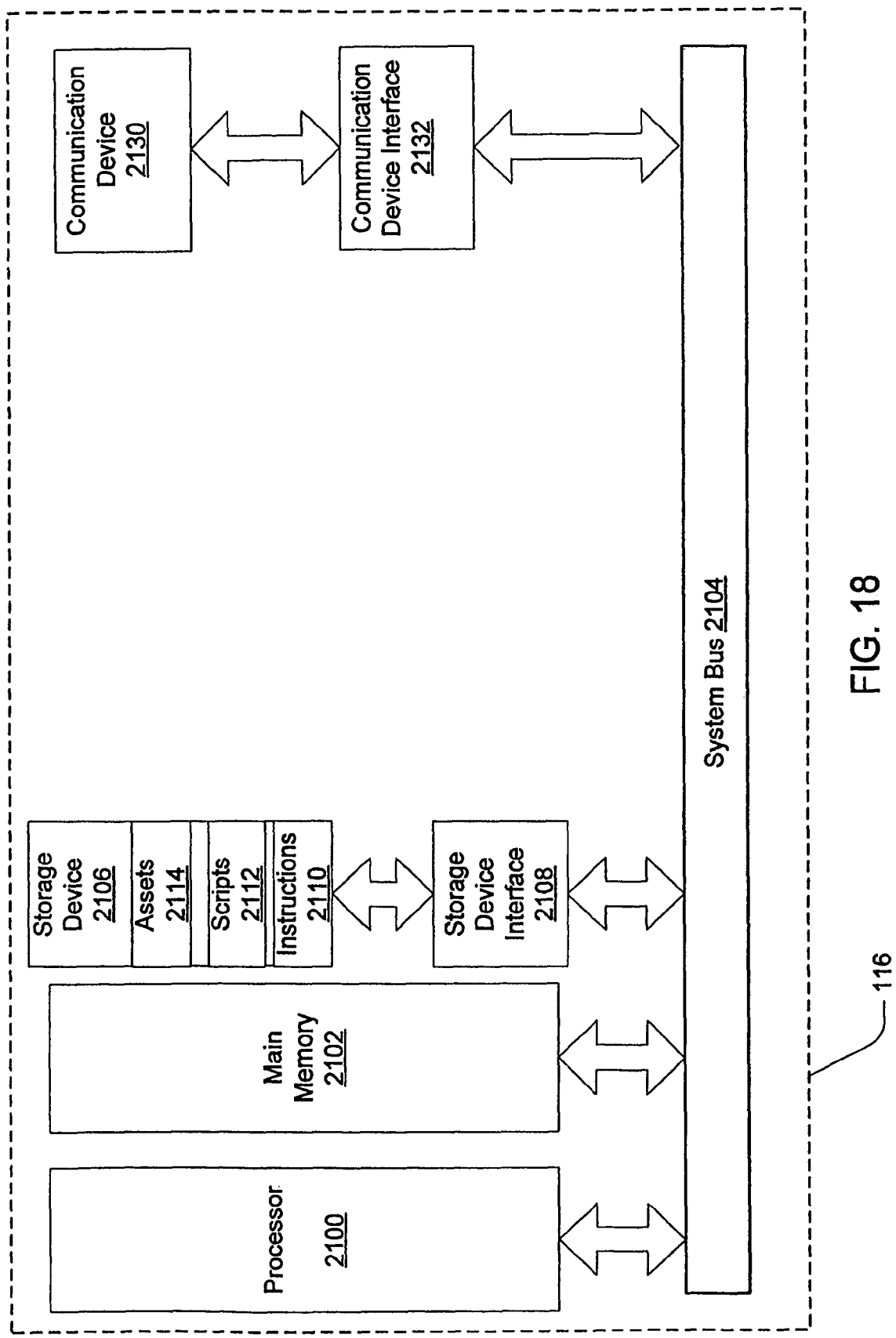
FIG. 18 is an architecture diagram for a server host in accordance with an exemplary embodiment of the present invention.

FIG. 18 is an architecture diagram for a multimedia presentation server host in accordance with an exemplary embodiment of the present invention. A multimedia presentation server host 116 includes a processor 2100 coupled to a main memory 2102 via a system bus 2104. The processor is further coupled to a storage device interface 2108 via the system bus. The storage device interface is used by the processor to retrieve programming instructions 2110 stored in a storage device 2106. The processor retrieves the programming instructions and stores them in memory for execution in order to configure the processor to implement the features of a multimedia presentation server as described above.

The storage device may further include storage locations for presentation scripts 2112. The presentation scripts include executable or interpretable instructions used by a multimedia presentation system to generate and display audio and visual components of a presentation using associated presentation assets 2114.

The processor may be further coupled to a communication device interface 2132 via the system bus. The processor uses the communication device interface to control a communication device 2130 coupled to a communications network (not shown). The processor may then transmit and receive communications, such as presentation scripts and presentation assets, to and from a multimedia presentation system via the communications network.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method of generating a multimedia presentation by a multimedia presentation system, the multimedia presentation including a sequence of visual frames, the method comprising:
   reading a presentation script by the presentation system, the presentation script including presentation instructions for a combination of a plurality of visual assets into visual frames in a multimedia presentation;
   parsing the presentation script by the presentation system into presentation instructions for the visual assets; and
   generating, by the presentation system, a sequence of visual frames using the visual assets and the presentation instructions such that for each of a substantial number of individual visual frames, a selected plurality of the plurality of visual assets are combined into the individual visual frame according to the presentation instructions, wherein generating an individual visual frame includes:
      selecting selected visual assets from the plurality of visual assets to combine into the individual visual frame according to the presentation instructions,
      modifying the selected visual assets prior to combining according to the presentation instructions,
      positioning the modified selected visual assets in the individual visual frame according to the presentation instructions, and
      combining the modified selected visual assets such that when the positioning of a first and a second modified selected visual asset results in an intersection between the first and second modified visual assets in the individual visual frame, at the intersection of the first and second modified selected visual assets, the first and second modified selected visual assets are layered according to the presentation instructions.

2. The method of claim 1, further comprising receiving the presentation script by the presentation system from a multimedia presentation server via a communications network.

3. The method of claim 1, further comprising receiving the assets by the presentation system from a multimedia presentation server via a communications network.

4. The method of claim 1, further comprising receiving the presentation script by the presentation system from a second multimedia presentation system via a communications network.

5. The method of claim 1, further comprising receiving the assets by the presentation system from a second multimedia presentation system via a communications network.

6. The method of claim 1, further comprising modifying the presentation script by a user using the presentation system.

7. The method of claim 6, further comprising transmitting a modified presentation script by the presentation system to a multimedia presentation server via a communications network.

8. The method of claim 6, further comprising transmitting a modified presentation script by the presentation system to a second multimedia presentation system via a communications network.

9. The method of claim 6, wherein modifying the presentation script by a user using the presentation system further includes associating a user asset with the presentation script.

10. The method of claim 9, further comprising transmitting the user asset and a modified presentation script associated with the user asset by the presentation system to a multimedia presentation server via a communications network.

11. The method of claim 9, further comprising:
    transmitting a modified presentation script associated with the user asset by the presentation system to a multimedia presentation server via the communications network;
    receiving a request from a second presentation system via a communications network, the request including a request for transmission of the user asset associated with the modified presentation script; and
    transmitting the requested user asset by the presentation system to the second presentation system via the communications network in response to the request.

12. The method of claim 9, further comprising transmitting the user asset and a modified presentation script associated with the user asset by the presentation system to a second multimedia presentation system via a communications network.

13. The method of claim 9, further comprising:
transmitting a modified presentation script associated with the user asset by the presentation system to a second multimedia presentation system via the communications network;
receiving a request from the second presentation system via a communications network, the request including a request for transmission of the user asset associated with the modified presentation script; and
transmitting the requested user asset by the presentation system to the second presentation system via the communications network in response to the request.

14. A system for editing a multimedia presentation that includes plurality of scenes, each scene including a sequence of visual displays, the multimedia presentation being defined by a presentation script such as a presentation script including instructions that include identification of a plurality of content assets, identification of one or more visual displays in which the identified content assets are to be included, one or more modifications of the content assets to be performed prior to inclusion of the identified content assets in the one or more visual displays, instructions for positioning the modified content assets in the one or more visual displays, and layering instructions for determining, for a portion of the visual display that includes plurality of modified content assets, the forward and backward relation of the plurality of modified assets to each other in the visual display, the system comprising:
a processor configured to implement a user interface for editing a presentation script defining a multimedia presentation, the user interface comprising:
a timeline strip for indicating a display order for individual scenes in a presentation; and
a compose window coupled to the timeline strip for editing individual scenes in a presentation and individual content assets within the individual scenes, resulting in corresponding edits being made to the presentation script by the processor.

15. The system of claim 14, the compose window further including an interpolation control by which a user identifies a content asset for interpolation that appears in a first and second non-consecutive visual displays with the content asset for interpolation having different instructions for positioning for the first and second visual displays and results in the instructions for positioning for the content asset for interpolation to be defined in the presentation instructions for the visual display occurring sequentially between the first and second visual displays according to a combination of the different instructions for positioning for the identified content assets.

16. The system of claim 14, the compose window further including an interpolation control by which a user identifies a content asset for interpolation that appears in a first and second non-consecutive visual displays with the content asset for interpolation having different modifications for the first and second visual displays and results in the modifications for the content asset for interpolation to be defined in the presentation instructions for the visual display occurring sequentially between the first and second visual displays according to a combination of the different modifications for the identified content assets.

17. The system of claim 16 wherein the modifications include one or more chosen from the group consisting of: horizontal scaling, vertical scaling, color, transparency, and rotation.

18. The system of claim 14, further comprising an asset bin for display of available presentation asset.

19. The system of claim 18, wherein the asset bin is for display of available scenes for inclusion in the timeline strip.

20. The system of claim 18, wherein the asset bin is for display of available background music.

21. The system of claim 18, wherein the asset bin is for display of available backgrounds.

22. The system of claim 18, wherein the asset bin includes a thumbwheel for scrolling of available presentation assets.

23. The system of claim 14, the compose window further including a frame in slider for adjusting the frame in cue of a presentation asset.

24. The system of claim 14, the compose window further including a frame out slider for adjusting the frame out cue of a presentation asset.

25. The system of claim 14, the compose window further including a scene length control interface for modifying the playback length of a scene.

26. The system of claim 25, the scene length control interface comprising:
a total frames field for a user to enter a desired total frames number for the scene; and
a scene length definition menu for a user to define how the length change is to be applied to the scene.

27. A system for editing a multimedia presentation that includes a sequence of visual displays, the multimedia presentation being defined by a presentation script such as a presentation script including instructions that include identification of a plurality of content assets, identification of one or more visual displays in which the identified content assets are to be included, one or more modifications of the content assets to be performed prior to inclusion of the identified contents asset in the one or more visual displays, instructions for positioning the modified content assets in the one or more visual displays, and layering instructions for determining, for a portion of the visual display that includes plurality of modified content assets, the forward and backward relation of the plurality of modified assets to each other in the visual display, the system comprising:
a processor configured to implement a user interface for editing a content asset for a multimedia presentation, comprising:
a bounding box around a display of the content asset, the bounding box including asset editing buttons that cause modifications to a presentation script to accomplish asset editing functions associated with the asset editing buttons.

28. The system of claim 27, wherein the asset editing buttons include a delete button.

29. The system of claim 27, wherein the asset editing buttons include a rotation button.

30. The system of claim 27, wherein the asset editing buttons include a resizing button.

31. The system of claim 27, wherein the asset editing buttons include a flip horizontal button.

32. The system of claim 27, wherein the asset editing buttons include a flip vertical button.

33. The system of claim 27, wherein the asset editing buttons include a layer modification button.

34. The system of claim 27, wherein the asset editing buttons include a color modification button.

35. The system of claim 27, further including a color selection panel displayed within the bounding box.

36. The system of claim 27, further including a transparency selection slider displayed within the bounding box.

37. The system of claim 27, wherein the asset editing buttons include an add key frame button for inserting key frames to a presentation asset for further adjusting the presentation asset's animation within a presentation.

38. The system of claim 27, wherein the asset editing buttons include a light box button for displaying key frame images that are applied to a presentation asset.

39. A multimedia presentation system, comprising:
   a first data store that stores a plurality of content assets and a presentation script, the presentation script including:
      instructions that include identification of a content asset,
      identification of one or more visual displays in which the identified content asset is to be included,
      one or more modifications of the content asset to be performed prior to inclusion of the identified content asset in the one or more visual displays,
      instructions for positioning the modified content asset in the one or more visual displays, and
      layering instructions for determining, for a portion of the visual display that includes plurality of modified content assets, the forward and backward relation of the plurality of modified assets to each other in the visual display;
   a first processor coupled to the first data store, the first processor configured to:
      allow a first user to create a multimedia presentation that includes a sequence of visual frames, using a user interface comprising a defined set of characteristics, the multimedia presentation being stored on the first data store as a presentation script and content assets identified in the presentation script;
   a second data store that stores the multimedia presentation; and
   a second processor coupled to the second data store, the second processor configured to:
      generate a displayed multimedia presentation using the stored multimedia presentation; and
      allow a second user to edit the stored multimedia presentation to create a second multimedia presentation using a user interface comprising the defined set of characteristics.

40. The multimedia presentation system of claim 39, wherein the first processor and the second processor comprise the same physical processor.

41. The multimedia presentation system of claim 39, wherein the first processor and the second processor comprise separate physical processors.

42. The multimedia presentation system of claim 39, wherein the first data store and the second data store comprise the same physical data store.

43. The multimedia presentation system of claim 42, wherein the first processor and the second processor comprise separate physical processors and the second processor is connected to the first data store and the second data store via a communications network.

44. The multimedia presentation system of claim 43, wherein the second processor stores the second multimedia presentation on the first data store and the second data store via a communications network.

45. The multimedia presentation system of claim 43, wherein the first processor is connected to the first data store and the second data store via a communications network.

46. The multimedia presentation system of claim 39, wherein the first data store and the second data store comprise separate physical data stores.

47. The multimedia presentation system of claim 39, wherein the multimedia presentation includes one or more presentation assets and a presentation script to generate the displayed multimedia presentation using the presentation asset.

48. The multimedia presentation system of claim 47, wherein the presentation script is stored in a format compatible with the first processor and the second processor on the first data store and the second data store.

49. The multimedia presentation system of claim 47, wherein the second processor is further configured to allow the second user to edit the presentation script to create the second multimedia presentation.

50. The multimedia presentation system of claim 47, wherein the second processor is further configured to allow the second user to add one or more presentation assets used by an edited presentation script.

51. The multimedia presentation system of claim 47, wherein the second processor is further configured to allow the second user to retrieve the presentation script from a server via a communications network.

52. The multimedia presentation system of claim 39, wherein the multimedia presentation is stored in a format compatible with the first processor and the second processor on the first data store and the second data store.

53. The multimedia presentation system of claim 39, wherein the first processor comprises a first software engine that allows the first user to create the multimedia presentation and store the multimedia presentation on the first data store and the second processor comprises a second software engine to generate the displayed multimedia presentation using the stored multimedia presentation and allow the second user to edit the stored multimedia presentation to create the second multimedia presentation.

54. The multimedia presentation system of claim 53, wherein the first software engine and the second software engine comprise the same software engine.

* * * * *